(12) United States Patent
Kishikawa et al.

(10) Patent No.: US 11,929,895 B2
(45) Date of Patent: Mar. 12, 2024

(54) COMMUNICATION LOG AGGREGATION DEVICE AND COMMUNICATION LOG AGGREGATION METHOD

(71) Applicant: Panasonic Intellectual Property Corporation of America, Torrance, CA (US)

(72) Inventors: Takeshi Kishikawa, Osaka (JP); Ryo Hirano, Kanagawa (JP); Yoshihiro Ujiie, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/854,182

(22) Filed: Jun. 30, 2022

(65) Prior Publication Data

US 2022/0337494 A1  Oct. 20, 2022

Related U.S. Application Data

(63) Continuation of application No. PCT/JP2021/018960, filed on May 19, 2021.

(30) Foreign Application Priority Data

May 26, 2020  (WO) ............... PCT/JP2020/020813

(51) Int. Cl.
*H04L 43/026* (2022.01)
*G07C 5/08* (2006.01)
*H04L 67/12* (2022.01)

(52) U.S. Cl.
CPC .......... *H04L 43/026* (2013.01); *G07C 5/0858* (2013.01); *H04L 67/12* (2013.01)

(58) Field of Classification Search
CPC ....... H04L 43/026; H04L 67/12; H04L 43/04; H04L 67/34; H04L 47/00; H04L 41/045;
(Continued)

(56) References Cited

U.S. PATENT DOCUMENTS 7,054,930 B1\* 5/2006 Cheriton ................. H04L 67/34
726/13
7,739,159 B1\* 6/2010 Chandrupatla ..... H04L 12/1403
705/40

(Continued)

FOREIGN PATENT DOCUMENTS

| JP | 2011-146982 A | 7/2011 |
| JP | 2015-171052 A | 9/2015 |
| JP | 2019-047413 A | 3/2019 |

OTHER PUBLICATIONS

"IEEE Standard for Local and metropolitan area networks-Media Access Control (MAC) Security", IEEE Computer Society, IEEE Std 802.1AE™, Sep. 2018.
(Continued)

*Primary Examiner* — Javier O Guzman
(74) *Attorney, Agent, or Firm* — Greenblum & Bernstein, P.L.C.

(57) ABSTRACT

A communication log aggregation device includes: a communicator that obtains flow information including one or more flow records and first statistical information for each flow from each of collection devices, the one or more flow records each including flow identification information included in a message received by at least one observer that is disposed in a control network system, the flow being classified based on the flow identification information, the collection devices each collecting the one or more flow records and the first statistical information for each flow from the message received by the observer; and a flow aggregator that generates aggregated flow information by (Continued)

performing at least one of the following: (i) selecting at least one of the one or more flow records, (ii) adding second statistical information, and (iii) deleting at least one of the one or more flow records, and outputs the aggregated flow information.

20 Claims, 22 Drawing Sheets

(58) Field of Classification Search
CPC ............... H04L 41/0604; H04L 41/069; H04L 63/1425; H04L 43/02; H04L 2012/40208; H04L 2012/40273; G07C 5/0858; G07C 5/0841; G06F 16/24556; G06F 16/1815; G06F 16/23; H04W 12/122
See application file for complete search history.

(56) References Cited

U.S. PATENT DOCUMENTS

| | | | | |
|---|---|---|---|---|
| 8,169,910 B1* | 5/2012 | Kohn | ............... | H04L 43/026 709/224 |
| 2009/0303879 A1* | 12/2009 | Duffield | ............... | H04L 47/41 375/253 |
| 2010/0226282 A1* | 9/2010 | Aitken | ............... | H04L 63/02 370/254 |
| 2013/0262703 A1* | 10/2013 | Dong | ............... | H04L 47/38 709/247 |
| 2014/0059216 A1* | 2/2014 | Jerrim | ............... | H04L 67/104 709/224 |
| 2014/0136680 A1* | 5/2014 | Joshi | ............... | H04L 43/12 709/224 |
| 2015/0256649 A1* | 9/2015 | Nishi | ............... | H04L 69/40 709/203 |
| 2017/0171050 A1* | 6/2017 | Puzis | ............... | H04L 43/0876 |
| 2020/0028857 A1* | 1/2020 | Warmenhoven | ........ | H04L 41/06 |
| 2020/0412755 A1* | 12/2020 | Jing | ............... | H04L 63/1441 |
| 2021/0328940 A1* | 10/2021 | Patki | ............... | H04L 45/50 |

OTHER PUBLICATIONS

S. Bellovin, "Guidelines for Specifying the Use of IPsec Version 2", Network Working Group, RFC 5406, BCP: 146, Best Current Practice, Feb. 2009.

B. Claise et al., "Specification of the IP Flow Information Export (IPFIX) Protocol for the Exchange of Flow Information", Internet Engineering Task Force (IETF), RFC: 7011, Sep. 2013.

International Search Report (including English Language Translation), dated Jul. 7, 2020, by the Japan Patent Office (JPO), in International Application No. PCT/JP2020/020813.

International Search Report (including English Language Translation), dated Jul. 13, 2021, by the Japan Patent Office (JPO), in International Application No. PCT/JP2021/018960.

Extended European Search Report (EESR) from European Patent Office (EPO) in European Patent Appl. No. 21811901.4, dated Nov. 6, 2023.

Dressler et al., "Flexible Flow Aggregation for Adaptive Network Monitoring," Proceedings. 2006 31st IEEE Conference on Local Computer Networks, IEEE, pp. 702-709, XP031332377 (Nov. 14, 2006).

* cited by examiner

FIG. 5

| Collection point | Source IP address | Destination IP address | Source port | Destination port | Transport protocol | Number of messages |
|---|---|---|---|---|---|---|
| 300a | 192.168.1.1 | 192.168.1.10 | 5000 | 6001 | UDP | 2000 |
| 300a | 192.168.1.2 | 192.168.1.1 | 5000 | 5001 | UDP | 300 |
| ... | ... | ... | ... | ... | ... | ... |
| 300d | 192.168.1.1 | 192.168.1.10 | 5000 | 5001 | UDP | 2000 |

FIG. 17

| Collection point | Source IP address | Destination IP address | Source port | Destination port | Transport protocol | Number of messages | Number of previous messages |
|---|---|---|---|---|---|---|---|
| Internal | 200.200.200.10 | 100.100.100.10 | 80 | 50100 | TCP | 100 | 0 |
| External | 100.100.100.10 | 200.200.200.10 | 50100 | 80 | TCP | 50 | 0 |
| App-to-app | 127.0.0.1 | 127.0.0.1 | 50000 | 50001 | UDP | 10 | 9 |
| ... | ... | ... | ... | ... | ... | ... | ... |
| Internal | 192.168.1.1 | 192.168.1.10 | 5000 | 6001 | UDP | 2000 | 2000 |

COMMUNICATION LOG AGGREGATION DEVICE AND COMMUNICATION LOG AGGREGATION METHOD

CROSS REFERENCE TO RELATED APPLICATIONS

This is a continuation application of PCT International Application No. PCT/JP2021/018960 filed on May 19, 2021, designating the United States of America, which is based on and claims priority of PCT International Application No. PCT/JP2020/020813 filed on May 26, 2020. The entire disclosures of the above-identified applications, including the specifications, drawings and claims are incorporated herein by reference in their entirety.

FIELD

The present disclosure relates to communication log aggregation devices and communication log aggregation methods.

BACKGROUND

Recent years have seen a large number of devices called electronic control units (ECUs) installed in automotive interior systems. A network connecting these ECUs is called an in-vehicle network. There are numerous standards for the in-vehicle network; among these, one of the most dominant in-vehicle network standards is a controller area network (hereinafter referred to as a CAN). Furthermore, as self-driving, connected cars, etc., become common, traffic on the in-vehicle network is expected to increase, and the spread of in-vehicle Ethernet is advancing.

Meanwhile, due to the widespread use of connected cars, there has been a concern about the risk of an attacker making unauthorized access to an in-vehicle network via an external network away from a vehicle and controlling the vehicle without authorization; thus, discussion on security issues is ongoing.

Suggested approaches for improving the security of the in-vehicle network include, for example, using cryptographic communication to prevent an unauthorized node from performing communication and using domain separation to protect a control network, as indicated in Non Patent Literature (NPL) 1 and 2, both of which have been used in existing internet protocol (IP) communication. Meanwhile, a method for collecting statistical information of packets with the same attribute called "flow" from header information included in communication packets, in order to monitor the trend of network traffic, has been disclosed (NPL 3).

CITATION LIST

Non Patent Literature

NPL 1: RFC5406: Guidelines for Specifying the Use of IPsec Version 2
NPL 2: IEEE 802.1AE: MAC Security
NPL 3: RFC7011: Specification of the IP Flow Information Export (IPFIX) Protocol for the Exchange of Flow Information

SUMMARY

Technical Problem

It is also expected that when the IP communication becomes common, a technique similar to that disclosed in NPL 3 is used in control network systems such as the in-vehicle network to find a traffic trend at each domain and check whether any unauthorized access has been made by an attacker.

However, since NPL 3 discloses only the means for reporting flow information (for example, a communication log), directly applying this technique to the control network systems such as the in-vehicle network would result in flow information collected at two or more different domains being reported. This leads to an increase in the amount of traffic in a control network based on communication of the flow information. Furthermore, this is not desirable from the viewpoints of analysts who analyze network logs because this causes an increase in the number of logs to be analyzed and makes analytical work more complicated, for example.

Thus, the present disclosure provides a communication log aggregation device and method in which communication logs can be properly aggregated in a control network system.

Solution to Problem

A communication log aggregation device according to one aspect of the present disclosure is a communication log aggregation device used in a control network system including two or more subnetworks and is disposed in the control network system and includes: an obtainer that obtains flow information including one or more flow records and first statistical information for each flow from each of collection devices, the one or more flow records each including flow identification information included in a message received by at least one observer, the flow being classified based on the flow identification information, the collection devices each being disposed in a different one of the two or more subnetwork systems and each collecting the one or more flow records and the first statistic& information for each flow from the message received by the at least one observer, the at least one observer being disposed in the control network system and receiving the message; and an information processor that generates aggregated flow information by performing at least one of the following: (i) selecting at least one of the one or more flow records included in one or more flow information items in the flow information obtained, (ii) adding second statistical information based on the first statistic& information, and (iii) deleting at least one of the one or more flow records, and outputs the aggregated flow information generated.

A communication log aggregation method according to one aspect of the present disclosure is a communication log aggregation method used in a control network system including two or more subnetworks and includes: obtaining flow information including one or more flow records and first statistic& information for each flow from each of collection devices, the one or more flow records each including flow identification information included in a message received by at least one observer, the flow being classified based on the flow identification information, the collection devices each being disposed in a different one of the two or more subnetwork systems and each collecting the one or more flow records and the first statistical information for each flow from the message received by the at least one observer, the at least one observer being disposed in the control network system and receiving the message; and generating aggregated flow information by performing at least one of the following: (i) selecting at least one of the one or more flow records included in one or more flow information items in the flow information obtained, (ii) adding second statistical information based on the first statistical information, and (iii) deleting at least one of the one or more flow records, and outputting the aggregated flow information generated.

Advantageous Effects

With a communication log aggregation device, etc., according to one aspect of the present disclosure, it is possible to properly aggregate communication logs in a control network system.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 is a diagram illustrating one example of the latest flow information according to Embodiment 1.

FIG. 17 is a diagram illustrating one example of the latest flow information according to Embodiment 2.

DESCRIPTION OF EMBODIMENTS

Figure 1:
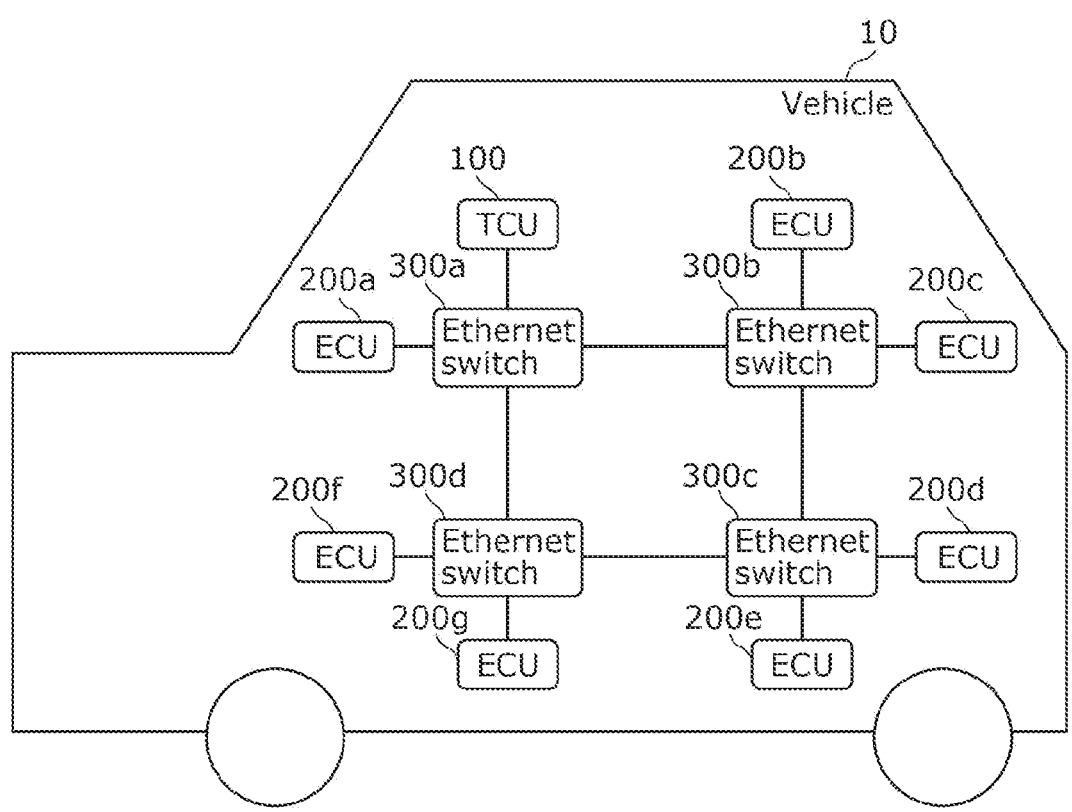
FIG. 1 is a configuration diagram of an in-vehicle network monitoring system according to Embodiment 1.

A communication log aggregation device according to one aspect of the present disclosure is a communication log aggregation device used in a control network system including two or more subnetworks and is disposed in the control network system and includes: an obtainer that obtains flow information including one or more flow records and first statistical information for each flow from each of collection devices, the one or more flow records each including flow identification information included in a message received by at least one observer, the flow being classified based on the flow identification information, the collection devices each being disposed in a different one of the two or more subnetwork systems and each collecting the one or more flow records and the first statistical information for each flow from the message received by the at least one observer, the at least one observer being disposed in the control network system and receiving the message; and an information processor that generates aggregated flow information by performing at least one of the following: (i) selecting at least one of the one or more flow records included in one or more flow information items in the flow information obtained, (ii) adding second statistical information based on the first statistical information, and (iii) deleting at least one of the one or more flow records, and outputs the aggregated flow information generated.

This makes it possible to aggregate communication logs (flow information) collected at a plurality of observers (observation points) of a control network, and therefore is effective in reducing a log size (for example, the amount of information). Thus, even when the control network system is configured to include two or more different domains, it is possible to properly aggregate the communication logs.

Furthermore, for example, the at least one observer may include a first observer and a second observer, and the first observer and the second observer may be disposed in the control network system, the at least one obtainer may obtain first flow information collected from the message received by the first observer and second flow information collected from the message received by the second observer, and when the flow identification information of a first flow record included in the first flow information and the flow identification information of a second flow record included in the second flow information are identical, the information processor may exclude one of the first flow record and the second flow record in generating the aggregated flow information.

With this, a message transferred to two or more subnetworks is not left as overlapping logs, and therefore this is effective in reducing network communication logs.

Furthermore, for example, each of the one or more flow information items may include observer identification information identifying the at least one observer that has collected the flow information item, and the information processor may add the observer identification information included in one of the first flow information and the second flow information to an other of the first flow information and the second flow information.

With this, even when the flow information is aggregated, the observer identification information can be kept from being deleted. Thus, useful aggregated flow information can be generated at the time of analysis for anomalies, etc., in the control network system.

Furthermore, for example, the first statistical information may include a statistic based on an amount of messages received, each of the messages being the message, and when one or more flow identification information items of the first flow record included in the first flow information and one or more flow identification information items of the second flow record included in the second flow information are identical and furthermore, a first reception amount included in the first flow information and a second reception amount included in the second flow information satisfy a predetermined relationship, the information processor may exclude one of the first flow record and the second flow record in generating the aggregated flow information.

This makes it possible to check the consistency between the flow information collected at one observer and the flow information collected at a different observer before outputting said flow information as an aggregated flow, making it possible to aggregate said flow information as a network communication log that is useful in terms of security.

Furthermore, for example, when the first reception amount and the second reception amount do not satisfy the predetermined relationship, the information processor may further add, to at least one of the first flow record or the second flow record, an anomaly identification flag indicating presence of an anomaly.

With this, by referring to the aggregated flow information, it is possible to easily identify an anomalous flow record and a normal flow record, enabling efficient analytical work on network communication logs.

Furthermore, for example, the predetermined relationship may include a condition that a difference between the first reception amount and the second reception amount is within a predetermined value.

With this, it is possible to add the anomaly identification flag when the difference between the first reception amount and the second reception amount is within the predetermined value.

Furthermore, for example, the communication log aggregation device may be installed in a vehicle, the communication log aggregation device may further include: a vehicle state determiner that determines a vehicle state of the vehicle, and the information processor may further perform, based on the vehicle state determined by the vehicle state determiner, at least one of the following: (i) selecting at least one of the one or more flow records; (ii) adding the second statistical information; and (iii) deleting at least one of the one or more flow records.

With this, it is possible to output a network communication log that is suitable for communication in the control network that varies according to the vehicle state of the vehicle. Thus, the flow information can be aggregated according to the vehicle state, and therefore it is possible to aggregate communication logs more properly.

Furthermore, for example, the vehicle state may include one of a state of being stationary and a state of self-driving.

With this, it is possible to properly aggregate communication logs according to whether the vehicle is stationary or driving itself.

Furthermore, for example, when the vehicle state is the state of being stationary, the information processor may select a flow record related to at least one of a diagnosis command or an update command from among the one or more flow records, and generate the aggregated flow information that includes the flow record selected.

Thus, it is possible to generate the aggregated flow information including the flow information corresponding to the situation in which the vehicle is stationary.

Furthermore, for example, when the vehicle state is the state of self-driving, the information processor may select a flow record related to self-driving control from among the one or more flow records, and generate the aggregated flow information that includes the flow record selected.

Thus, it is possible to generate the aggregated flow information including the flow information corresponding to the situation in which the vehicle is driving itself.

Furthermore, for example, when the vehicle state is neither the state of being stationary nor the state of self-driving, the information processor may generate the aggregated flow information that includes the one or more flow information items obtained.

Thus, it is possible to generate the aggregated flow information including the flow information corresponding to the vehicle state in which the vehicle is not stationary or driving itself.

Furthermore, for example, the at least one observer may include two or more observers, and each of the two or more observers may be disposed in a corresponding one of the two or more subnetworks and includes a corresponding one of the collection devices, and the information processor may change, according to the vehicle state, a priority given to each of two or more observers, and change, based on the priority changed, a ratio of one or more flow records collected by the two or more observers to be included in the aggregated flow information.

This makes it possible to aggregate necessary flow records at an appropriate ratio depending on communication in the control network that varies according to the vehicle state of the vehicle.

Furthermore, for example, the at least one observer may include: a third observer that communicates with an external network; a fourth observer that communicates with applications; and a fifth observer that communicates with an internal network.

With this, it is possible to effectively reduce the size (for example, the amount of information) of communication logs (flow information) in the communication performed with an external network, the app-to-app communication, and the communication performed within an internal network.

Furthermore, for example, the one or more flow information items may further include the first statistical information that has previously been obtained, and the information processor may generate the aggregated flow information based on the vehicle state of the vehicle and difference information that is a difference between the first statistical information and the first statistical information that has previously been obtained.

Thus, the aggregated flow information can be generated on the basis of the difference information. For example, by aggregating anomalous flow information on the basis of the difference information, it is possible to effectively aggregate the communication logs.

Furthermore, for example, when the vehicle state is a state of being stationary and a total number of third flow information items in which the first statistical information that has previously been obtained is zero and the first statistical information is other than zero is greater than or equal to a first number, the information processor may generate the aggregated flow information that includes the third flow information items, and when the vehicle state is not the state of being stationary and a total number of fourth flow information items in which the first statistical information that has previously been obtained is zero and the first statistical information is other than zero is greater than or equal to a second number less than the first number, the information processor may generate the aggregated flow information that includes the fourth flow information items.

Thus, it is possible to generate the aggregated flow information including flow information in which the previous statistical information is zero and the current statistical information is greater than the previous statistical information by at least a predetermined number. In other words, it is possible to generate the aggregated flow information including flow information that may be anomalous, Therefore, it is possible to properly aggregate communication logs at a point including flow information that may be anomalous.

Furthermore, for example, the information processor may further add different flags to each of the third flow information items and each of the fourth flow information items.

With this, by referring to the aggregated flow information, it possible to easily identify the third flow information and the fourth flow information, enabling efficient analytical work on network communication logs.

Furthermore, for example, the flow identification information may include at least one of a source IP address, a destination IP address, a source port number, a destination port number, a protocol number, or message ID, or include a combination of two or more of the source IP address, the destination IP address, the source port number, the destination port number, the protocol number, and the message ID.

With this, a flow can be properly identified using the information included in the message, and this is useful as a network communication log (communication log).

Furthermore, for example, the at least one observer may be an Ethernet switch included in the control network system and to which one or more electronic control devices are connected.

With this, when the control network system uses the Ethernet, it is possible to obtain the flow information without adding a new component.

Furthermore, for example, the aggregated flow information may be output in a format of internet protocol flow information export (IPFIX) or NetFlow.

This makes it possible to exchange the aggregated flow information in a common format. In other words, the versatility of the communication log aggregation device is enhanced.

Furthermore, a communication log aggregation method according to one aspect of the present disclosure is a communication log aggregation method used in a control network system including two or more subnetworks and includes: obtaining flow information including one or more flow records and first statistical information for each flow from each of collection devices, the one or more flow records each including flow identification information included in a message received by at least one observer, the flow being classified based on the flow identification information, the collection devices each being disposed in a different one of the two or more subnetwork systems and each collecting the one or more flow records and the first statistical information for each flow from the message received by the at least one observer, the at least one observer being disposed in the control network system and receiving the message; and generating aggregated flow information by performing at least one of the following: (i) selecting at least one of the one or more flow records included in one or more flow information items in the flow information obtained, (ii) adding second statistical information based on the first statistical information, and (iii) deleting at least one of the one or more flow records, and outputting the aggregated flow information generated.

This produces substantially the same advantageous effects as those produced by the above-described communication log aggregation device. For example, the communication logs (flow information) collected at two or more observation points of the control network can be aggregated, and thus this is effective in reducing the log size (for example, the amount of information).

Hereinafter, network communication log aggregation devices (communication log aggregation devices) according to exemplary embodiments of the present disclosure will be described with reference to the Drawings. Each exemplary embodiment described below shows a specific preferred example of the present disclosure. Specifically, the numerical values, shapes, materials, structural elements, the arrangement and connection of the structural elements, steps, the processing order of the steps, etc., shown in the following exemplary embodiments are mere examples of the present disclosure, and therefore do not limit the present disclosure. The present disclosure is defined based on the recitations of the Claims. Therefore, among the structural elements in the following exemplary embodiments, structural elements not recited in any one of the independent claims which indicate the broadest concepts of the present disclosure are not necessarily required to achieve the object of the present disclosure, but are described as structural elements of a more preferable embodiment.

Embodiment 1

The following describes a network communication log aggregation device (communication log aggregation device) to be used in a vehicle with an in-vehicle network (in-vehicle network system) in which two or more electronic control units (ECUs) communicate with each other via Ethernet (registered trademark).

[1.1 Configuration of In-Vehicle Network Monitoring System]

FIG. 1 is a configuration diagram of an in-vehicle network monitoring system according to the present embodiment. The in-vehicle network monitoring system is installed in vehicle 10. The in-vehicle network monitoring system is one example of the control network system.

As illustrated in FIG. 1, the in-vehicle network monitoring system includes telematics control unit (TCU) 100, ECU 200a, ECU 200b, ECU 200c, ECU 200d, ECU 200e, ECU 200f, ECU 200g, Ethernet switch 300a, Ethernet switch 300b, Ethernet switch 300c, and Ethernet switch 300d.

TCU 100, which includes an interface for connecting to an external network, communicates with an external server, for example. Furthermore, TCU 100 has a function of aggregating flow information (communication logs) reported from Ethernet switches 300a, 300b, 300c, 300d. TCU 100 is one example of the communication log aggregation device, TCU 100 is disposed in the in-vehicle network. For example, TCU 100 is disposed in a subnetwork to be described later.

ECU 200a, ECU 200b, ECU 200c, ECU 200d, ECU 200e, and ECU 200f communicate with each other via the network to exchange control instructions, sensor data, etc., thereby controlling the vehicle, Although not illustrated in FIG. 1, the in-vehicle network may include more ECUs.

ECU 200a, ECU 200b, ECU 200c, ECU 200d, ECU 200e, and ECU 200f, which are connected to sensors, actuators, etc., obtain sensor information and control the actuators, for example.

ECU 200a, ECU 200b, ECU 200c, ECU 200d, ECU 200e, and ECU 200f are, for example, devices including processors (microprocessors), digital circuits such as memory, analog circuits, communication circuits, etc. The memory, which is read-only memory (ROM) or random-access memory (RAM), is capable of storing a control program (computer program) that is executed using the processor.

For example, ECU 200a, ECU 200b, ECU 200c, ECU 200d, ECU 200e, and ECU 200f implement various functions by the processors operating according to the control programs. The computer program is configured by combining two or more instruction codes for the processors in order to implement a predetermined function.

Ethernet switch 300a receives a message from ECU 200a and transfers the received message to an appropriate port according to the content of the message. Ethernet switch 300b receives messages from ECUs 200b, 200c and transfers the received messages to appropriate ports according to the content of the messages. Ethernet switch 300c receives messages from ECUs 200d, 200e and transfers the received messages to appropriate ports according to the content of the messages. Ethernet switch 300d receives messages from ECUs 200f, 200g and transfers the received messages to appropriate ports according to the content of the messages.

Furthermore, Ethernet switches 300a, 300b, 300c, 300d collect statistical information of the communication content of the received messages and transmit, to TCU 100, flow information including the collected statistical information.

Note that in FIG. 1, the communication in the entire network is performed using Ethernet, but a different network may be included. For example, in a network for control systems, the CAN may be used and other protocols may also be used.

Note that Ethernet switch 300a and ECU 200a form one subnetwork. Ethernet switch 300b, ECU 200b, and ECU 200c form one subnetwork. Ethernet switch 300c, ECU 200d, and ECU 200e form one subnetwork. Ethernet switch 300d, ECU 200f, and ECU 200g form one subnetwork. Thus, the in-vehicle network monitoring system is configured to include one or more subnetworks. For example, the in-vehicle network monitoring system may be configured to include two or more subnetworks.

Note that each Ethernet switch functions as an observer that receives messages in the in-vehicle network monitoring system and also functions as a collection device that collects flow records. For example, the observer may be provided as an Ethernet switch included in the in-vehicle network monitoring system and to which one or more ECUs are connected. The observer and the collection device are not limited to being the same device and may be different devices. The observer is disposed, for example, in each of the two or more subnetworks. Note that the observer may be provided as another device disposed in the in-vehicle network monitoring system. For example, the observer may be provided as a router (not illustrated in the Drawings) or the like.

[1.2 Configuration of TCU 100]

Figure 2:
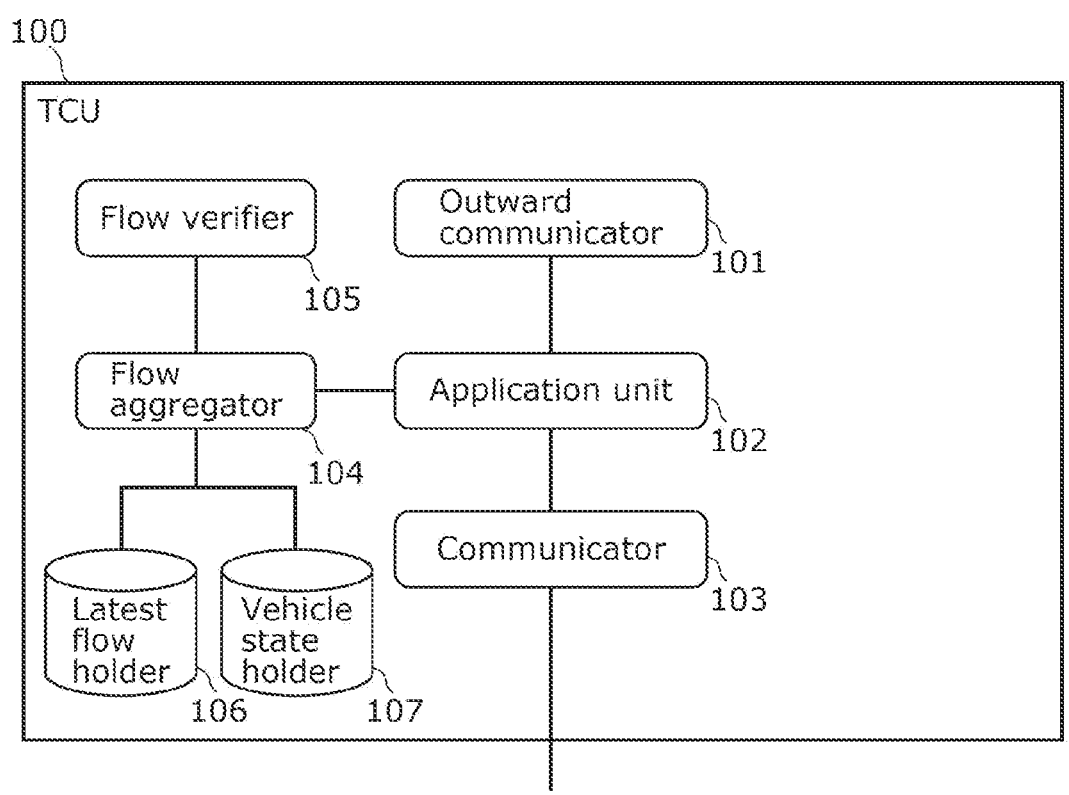
FIG. 2 is a configuration diagram of a TCU according to Embodiment 1.

FIG. 2 is a configuration diagram of TCU 100 according to the present embodiment.

As illustrated in FIG. 2, TCU 100 includes outward communicator 101, application unit 102, communicator 103, flow aggregator 104, flow verifier 105, latest flow holder 106, and vehicle state holder 107.

Outward communicator 101, which is a communication interface between vehicle 10 and an element external to vehicle 10, for example, the Internet, communicates with an external server installed outside the vehicle, and serves to report information of vehicle 10 to the external server, receive firmware from an external server, and transfer the firmware to the in-vehicle network, for example.

In application unit 102, for example, an application for reporting information of the in-vehicle network to an external server and an application for transferring, to the in-vehicle network, the firmware received from an external server operate.

Furthermore, application unit 102 serves to report, to flow aggregator 104, the flow information received from the in-vehicle network, receive the aggregated flow information, and report the aggregated flow information to an external server.

At application unit 102, more than one application can operate.

Communicator 103, which is connected to Ethernet switch 300a, receives the message transferred from Ethernet switch 300a.

Furthermore, communicator 103 transmits a message to Ethernet switch 300a according to a transmission request from application unit 102.

Flow aggregator 104 receives the flow information reported from Ethernet switches 300a, 300b, 300c, 300d and stores the flow information into latest flow holder 106.

Furthermore, flow aggregator 104 aggregates, at a predetermined interval (of 60 seconds, for example), the flows received from Ethernet switches 300a, 300b, 300c, 300d, and generates a new aggregated flow (aggregated flow information). It can also be said that flow aggregator 104 aggregates the flow information collected at two or more different domains.

The aggregated flow may be generated, for example, on the basis of at least one of the vehicle state stored in vehicle state holder 107 and the result of flow verification by flow verifier 105. The resultant aggregated flow is reported to an external server installed outside the vehicle, for example, as a communication log of the in-vehicle network.

Upon notification by flow aggregator 104, flow verifier 105 detects a mismatch between the flow information collected at Ethernet switch 300a and stored in latest flow holder 106, the flow information collected at Ethernet switch 300b and stored in latest flow holder 106, the flow information collected at Ethernet switch 300c and stored in latest flow holder 106, and the flow information collected at Ethernet switch 300d and stored in latest flow holder 106, and also detects a point of change in the flow information, for example. For example, regarding the number of observed messages included in the flow information of messages transferred from Ethernet switch 300a to Ethernet switch 300b, when there is a mismatch between the flow information collected at Ethernet switch 300a and the flow information collected at Ethernet switch 300b, flow verifier 105 reports this fact to flow aggregator 104.

Latest flow holder 106 holds the flow information received from Ethernet switches 300a, 300b, 300c, 300d, Detailed description of the latest flow information will be provided later.

Vehicle state holder 107 holds the latest vehicle state reported from application unit 102. Details of the vehicle state will be described later.

Note that flow verifier 105 and vehicle state holder 107 are not essential elements.

Note that the information processor is configured to include at least flow aggregator 104. For example, the information processor may be configured to include application unit 102, flow aggregator 104, and flow verifier 105.

[1.3 Configuration of ECU]

Figure 3:
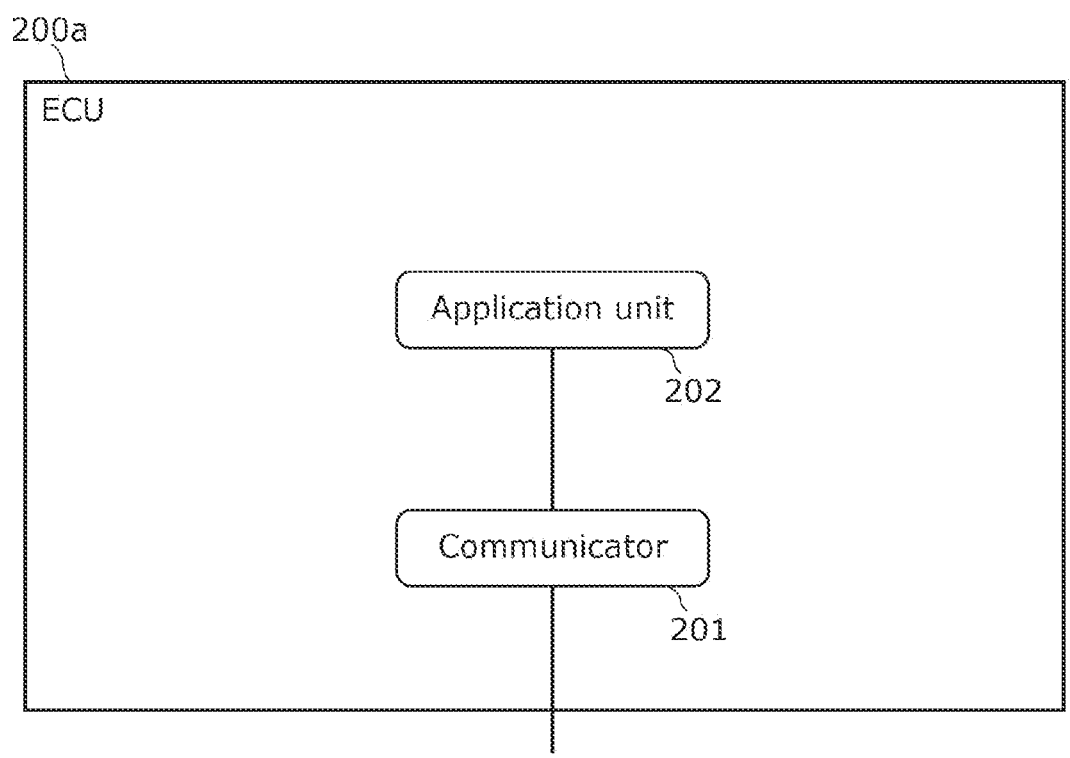
FIG. 3 is a configuration diagram of an ECU according to Embodiment 1.

FIG. 3 is a configuration diagram of ECU 200a according to the present embodiment. Note that ECU 200b to 200g have substantially the same configurations and therefore description thereof will be omitted.

As illustrated in FIG. 3, ECU 200*a* includes communicator 201 and application unit 202.

Communicator 201 is a communication interface that is connected to Ethernet switch 300*a* and transmits and receives frames.

Application unit 202 reads the value of a sensor connected to ECU 200*a* and executes an application for actuator control or the like.

[1.4 Configuration of Ethernet Switch]

Figure 4:
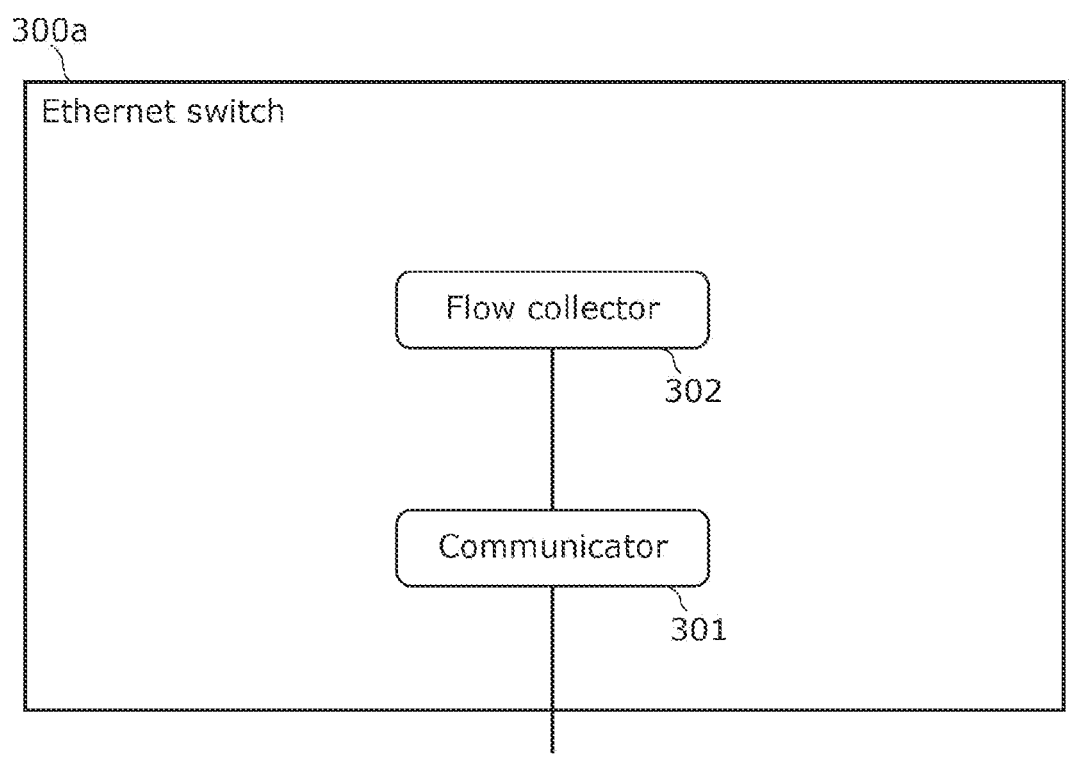
FIG. 4 is a configuration diagram of an Ethernet switch according to Embodiment 1.

FIG. 4 is a configuration diagram of Ethernet Switch 300*a* according to the present embodiment. Note that Ethernet switches 300*b*, 300*c*, 300*d* have substantially the same configurations and description thereof will be omitted.

As illustrated in FIG. 4, Ethernet switch 300*a* includes communicator 301 and flow aggregator 302.

Communicator 301, which includes a plurality of communication ports connected to TCU 100 and ECU 200*a*, transfers the received message according to the content of the message. Furthermore, in order to extract information for monitoring the received message, communicator 301 reports the message to flow collector 302.

Flow collector 302 collects the flow information on the basis of header information included in the message reported from communicator 301.

Flow collector 302 holds a statistic such as the number of received messages and the number of received bytes for each flow defined in advance, and updates the flow information corresponding to the received message.

Furthermore, the flow information is transmitted at a predetermined interval as messages, and the flow information that has been held is reset. The predetermined interval is, for example, 60 seconds; after collecting flow information for 60 seconds, Ethernet switch 300*a* transmits the flow information, resets the flow information, and resumes collecting flow information for 60 seconds.

[1.5 One Example of Latest Flow]

FIG. 5 is a diagram illustrating one example of the latest flow information according to the present embodiment. The latest flow information is stored in latest flow holder 106. FIG. 5 illustrates an example in which one row indicates information of one flow and the number of messages received for each flow is held. The flow means data with the same flow identification information, that is, data with the same attribute.

In each flow, the location at which the flow information is collected (the collection point), that is, for example, the identification information of the Ethernet switch that has collected the flow information, information for specifying the flow (that is, flow identification information including a combination of a source IP address, a destination IP address, a source port number, a destination port number, and a transport protocol), and the number of received messages are held.

The collection point, which is information for specifying an observer, is one example of the observer identification information.

It is sufficient that the flow identification information include at least one of the source IP address, the destination IP address, the source port number, the destination port number, the protocol number, the message ID, and the transport protocol. The flow identification information may include at least one of the source IP address, the destination IP address, the source port number, the destination port number, the protocol number, the message ID, and the transport protocol, or include a combination of two or more thereof. The flow record includes at least the flow identification information.

The number of messages is one example of the first statistical information. The number of messages indicated in FIG. 5 is, for example, the number of messages obtained in the same period.

The flow information includes, for example: information indicating a collection point; and one or more flow records.

The figure shows that regarding the flow in the first row, the collection point is "300*a*", the source IP address is "192.168.1.1", the destination IP address is "192.168.1.10", the source port number is "5000", the destination port number is "6001", the transport protocol is "UDP", and the number of received messages is "2000".

The figure also shows that regarding the flow in the second row, the collection point is "300*a*", the source IP address is "192.168.1.2", the destination IP address is "192.168.1.1", the source port number is "5000", the destination port number is "5001", the transport protocol is "UDP", and the number of received messages is "300".

The flows in the first and second rows are flow information obtained from Ethernet switch 300*a*. In other words, this flow information includes two flow records.

Illustration of flow information in the middle is omitted in the figure; the figure shows that regarding the flow in the last row (the fourth row), the collection point is "300*d*", the source IP address is "192.168.1.1", the destination IP address is "192.168.1.10", the source port number is "5000", the destination port number is "6001", the transport protocol is "UDP", and the number of received messages is "2000".

The flow in the last row is flow information obtained from Ethernet switch 300*d*. In other words, this flow information includes one flow record.

[1.6 One Example of Vehicle State]

Figure 6:
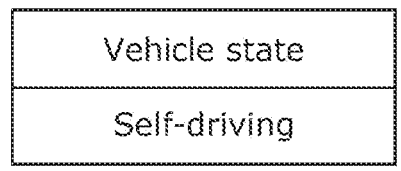
FIG. 6 is a diagram illustrating one example of a vehicle state according to Embodiment 1.

FIG. 6 illustrates one example of a vehicle state according to the present embodiment. The vehicle state is stored in vehicle state holder 107. FIG. 6 indicates that the current vehicle state is self-driving. The vehicle state can be updated on the basis of information included in a message or the like in the in-vehicle network.

Note that the vehicle state is not limited to the state of self-driving. Examples of the vehicle state include the state of being stationary, battery charging, traveling, high-speed traveling, a diagnostic mode, and firmware updating. Furthermore, the vehicle state may include at least the state of being stationary and the state of traveling such as self-driving. The state of traveling may include self-driving or driving by a human driver.

In light of this explanation, the configuration of TCU 100 according to the present embodiment will be described. TCU 100 according to the present embodiment, which is a communication log aggregation device used in an in-vehicle network monitoring system (one example of the control network system) including two or more subnetworks, is disposed in the in-vehicle network monitoring system. TCU 100 includes: communicator 103 (one example of the obtainer) which obtains flow information including one or more flow records and a total number of messages (one example of the first statistical information) for each flow from each of Ethernet switches (one example of the collection devices), the one or more flow records each including flow identification information included in a message received by the Ethernet switch (one example of the observer which is Ethernet switch 300*a* or the like), which is disposed in the in-vehicle network monitoring system and receives the message, the flow being classified based on the flow identification information, the Ethernet switches each being disposed in a different one of the two or more subnetwork systems and each collecting the one or more flow records and the total number of messages for each flow from the message received by the Ethernet switch; and flow aggregator 104 (one example of the information processor) which generates aggregated flow information by performing at least one of the following: (i) selecting at least one of the one or more flow records included in one or more flow information items in the flow information obtained, (ii) adding second statistical information (for example, anomaly flag information to be described later) based on the total number of messages, and (iii) deleting at least one of the one or more flow records, and outputs the aggregated flow information generated.

Note that the selecting of at least one of the one or more flow records includes, for example, selecting a desired flow record from among the one or more flow records. The deleting of at least one of the one or more flow records includes, for example, deleting a desired flow record from the one or more flow records.

[1.7 Flow Aggregation Sequence in TCU]

Figure 7:
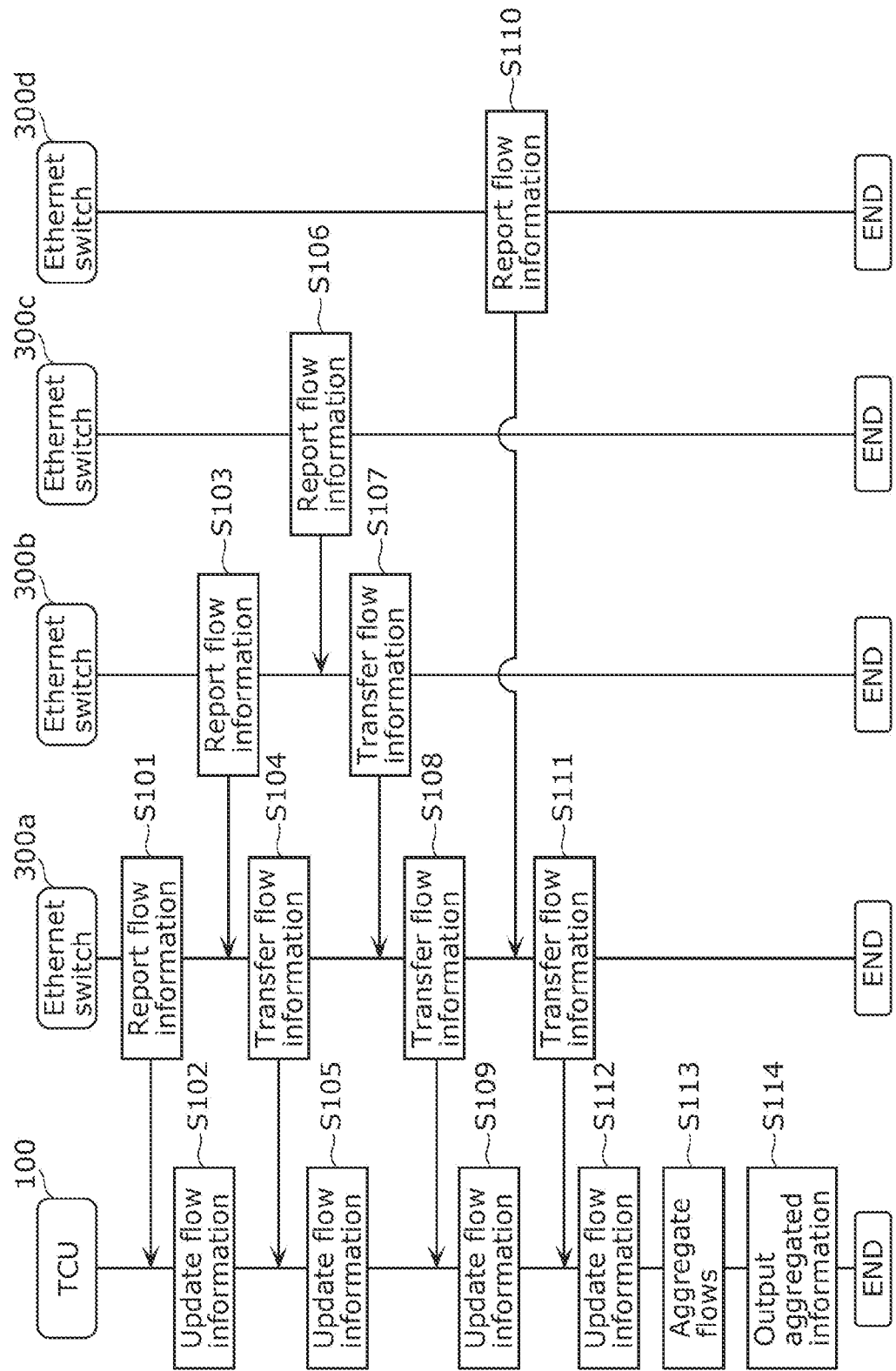
FIG. 7 is a diagram illustrating a flow aggregation sequence in a TCU according to Embodiment 1.

FIG. 7 is a diagram illustrating a flow aggregation sequence in TCU 100 according to the present embodiment. Specifically, FIG. 7 is a diagram illustrating a sequence in which flow information reported from Ethernet switches 300a, 300b, 300c, 300d are aggregated in TCU 100.

Ethernet switch 300a reports the flow information to TCU 100 (S101). Communicator 103 of TCU 100 receives the flow information from Ethernet switch 300a. Communicator 103 functions as the obtainer.

TCU 100 updates the latest flow information on the basis of the received flow information (S102). Flow aggregator 104 of TCU 100 updates, on the basis of the received flow information, the flow information corresponding to Ethernet switch 300a (the flow information collected at Ethernet switch 300a) and stored in latest flow holder 106. For example, flow aggregator 104 replaces the flow information corresponding to Ethernet switch 300a by the flow information received from Ethernet switch 300a at a predetermined interval (of 60 seconds, for example). In other words, for example, flow aggregator 104 replaces the number of messages in the flow information corresponding to Ethernet switch 300a by the number of messages in the flow information received from Ethernet switch 300a at a predetermined interval (of 60 seconds, for example). The update processes in Steps S105, S109, S112 indicated below will be performed in substantially the same manner.

Note that the predetermined intervals in the Ethernet switches are the same time interval, for example, but may be different from each other.

Ethernet switch 300b transmits the flow information to Ethernet switch 300a (S103).

Ethernet switch 300a transfers, to TCU 100, the flow information received from Ethernet switch 300b (S104). Communicator 103 of TCU 100 receives the flow information from Ethernet switch 300b via Ethernet switch 300a.

TCU 100 updates the latest flow information on the basis of the received flow information (S105). In Step S105, the flow information corresponding to Ethernet switch 300b is updated.

Ethernet switch 300c transmits the flow information to Ethernet switch 300b (S106).

Ethernet switch 300b transfers, to Ethernet switch 300a, the flow information received from Ethernet switch 300c (S107).

Ethernet switch 300a transfers, to TCU 100, the flow information received from Ethernet switch 300b (the flow information transmitted from Ethernet switch 300c) (S108). Communicator 103 of TCU 100 receives the flow information from Ethernet switch 300c via Ethernet switch 300a.

TCU 100 updates the latest flow information on the basis of the flow information received from Ethernet switch 300a (the flow information transmitted from Ethernet switch 300c) (S109). In Step S109, the flow information corresponding to Ethernet switch 300c is updated.

Ethernet switch 300d transmits the flow information to Ethernet switch 300a (S110).

Ethernet switch 300a transfers, to TCU 100, the flow information received from Ethernet switch 300d (S111). Communicator 103 of TCU 100 receives the flow information from Ethernet switch 300d via Ethernet switch 300a.

TCU 100 updates the latest flow information on the basis of the flow information received from Ethernet switch 300a (the flow information transmitted from Ethernet switch 300d) (S112). Step S112 is performed, for example, by flow aggregator 104 of TCU 100. In Step S112, the flow information corresponding to Ethernet switch 300d is updated.

Next, TCU 100 aggregates the latest flow information on the basis of whether a predetermined relationship is satisfied (S113). Step S113 is performed, for example, by flow aggregator 104.

Next, TCU 100 outputs the flow information that has been aggregated (aggregated flow information) (S114). TCU 100 transmits the aggregated flow information to an external server, for example.

[1.8 Flow Information Aggregation Flowchart for TCU]

Figure 8:
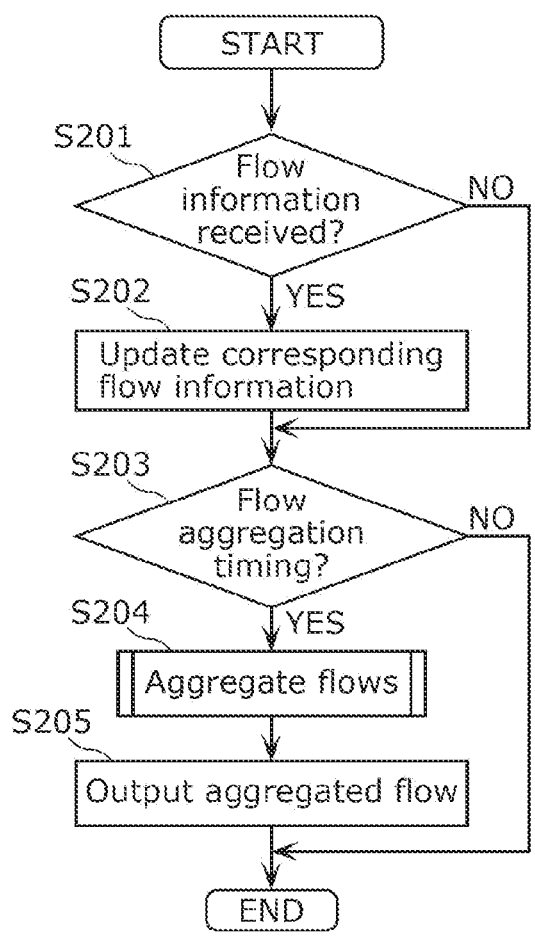
FIG. 8 is a flow information aggregation flowchart for a TCU according to Embodiment 1.

FIG. 8 is a flow information aggregation flowchart for TCU 100 according to the present embodiment. The processes illustrated in FIG. 8 are performed, for example, by flow aggregator 104.

TCU 100 determines whether the flow information has been received (S201).

When the flow information has been received (YES in S201), TCU 100 updates the corresponding latest flow information (S202) and performs Step S203.

When the flow information has not been received (NO in S201), TCU 100 performs Step S203.

Next, TCU 100 determines whether a predetermined timing for flow aggregation has come (S203). TCU 100 may determine, according to the amount of time elapsed since the previous flow aggregation, whether the current point in time is the predetermined timing, for example, but the determination method is not limited to this example; TCU 100 may determine, according to whether the current point in time is a predetermined time, whether the current point in time is the predetermined timing, for example.

When the current point in time is the flow aggregation timing (YES in S203), TCU 100 performs Step S204.

When the current point in time is not the flow aggregation timing (NO in S203), TCU 100 ends the processing.

Next, TCU 100 performs the flow aggregation process (S204), A specific process flow of the flow aggregation will be described with reference to FIG. 9 (the first flow aggregation method), FIG. 11 (the second flow aggregation method), and FIG. 13 (the third flow aggregation method). Note that TCU 100 aggregates the flow information using at least one of the first to third flow aggregation methods.

Subsequently, TCU 100 outputs the flow information that has been aggregated (aggregated flow information) (S205) and ends the processing.

[1.9 Process Flowchart of First Flow Aggregation Method]

Figure 9:
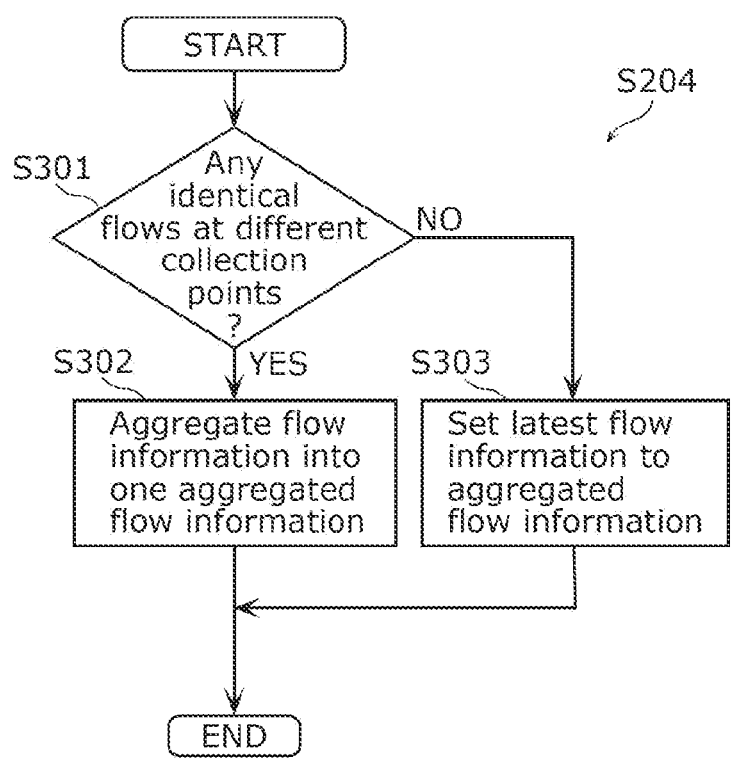
FIG. 9 is a flowchart of a first flow aggregation method for a TCU according to Embodiment 1.

FIG. 9 is a flowchart of the first flow aggregation method for TCU 100 according to the present embodiment. FIG. 9 is a flowchart illustrating one processing method (the first flow aggregation method) in a variation of the flow aggregation in Step S204 illustrated in FIG. 8. The processes illustrated in FIG. 9 are performed, for example, by flow aggregator 104.

TCU 100 checks (determines) whether the latest flow information includes the same flows (identical flows) at different collection points (S301). When identical flows are found at different collection points (for example, different Ethernet switches) (YES in S301), TCU 100 aggregates the corresponding flow information into one flow information as aggregated flow information (S302). Furthermore, when there are no identical flows at different collection points (NO in S301), TCU 100 sets the latest flow information to the aggregated flow information (S303). For example, TCU 100 sets the entire flow information included in the latest flow information to the aggregated flow information. Note that whether flows are identical is determined according to whether the flow information of one of the flows matches the flow information of another one of the flows. Determining whether there are identical flows is one example of determining whether the predetermined relationship is satisfied.

Figure 10:
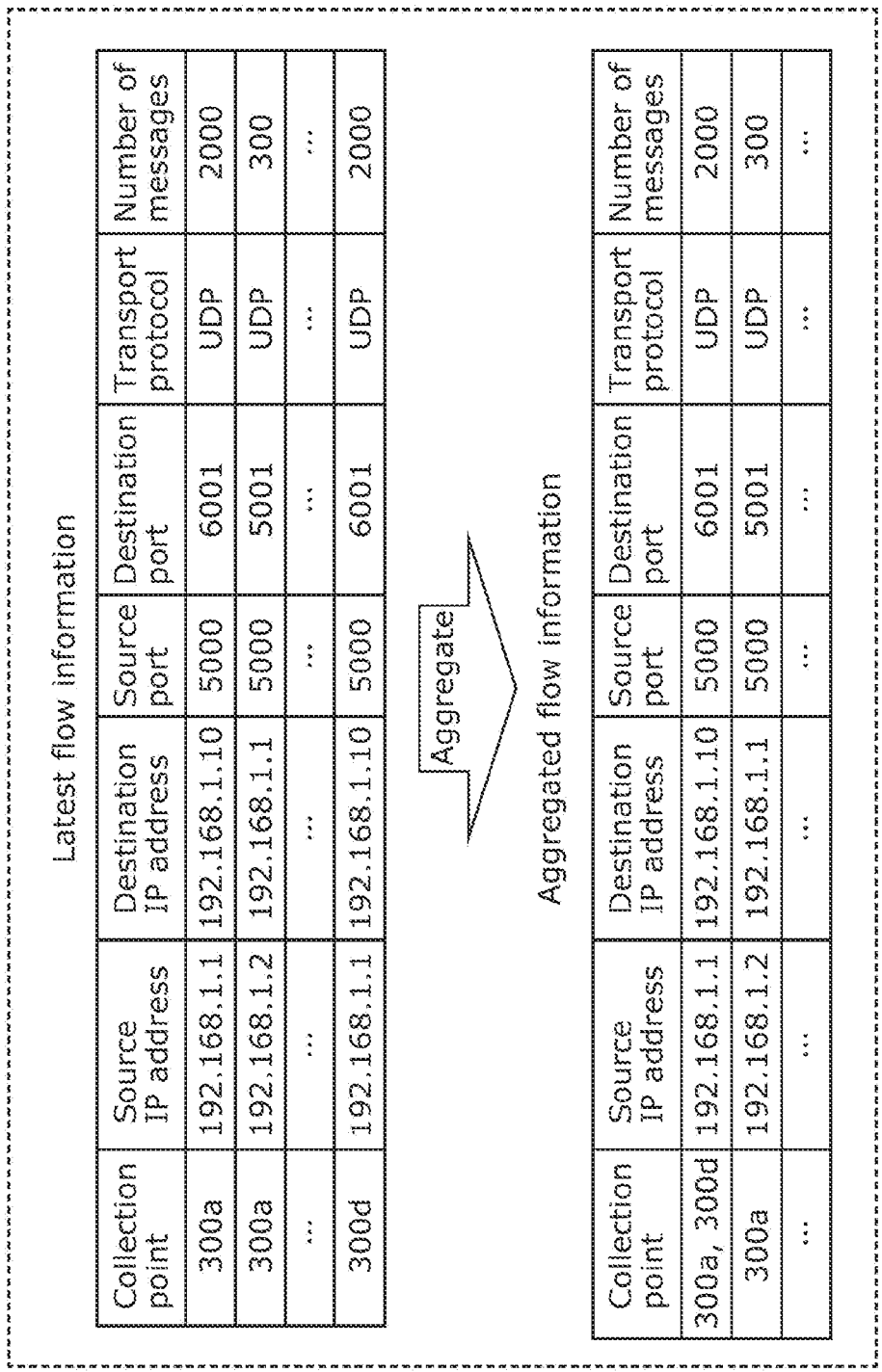
FIG. 10 is a diagram illustrating an output example of aggregated flow information obtained by a first flow aggregation method according to Embodiment 1.

FIG. 10 is a diagram illustrating an output example of the aggregated flow information obtained by the first flow aggregation method according to the present embodiment. FIG. 10 illustrates an aggregated flow (aggregated flow information) output by the first flow aggregation method based on the latest flow information illustrated in FIG. 5. In the latest flow information, the flow in the first row (the first flow) and the flow in the fourth row (the second flow) are identical; specifically, these flows have the same source IP address, the same destination IP address, the same source port, the same destination port, and the same transport protocol, and thus the information of these flows is aggregated into one flow information. In the aggregated flow information, 300a, 300b refer to the collection point for the information of these flows, and the number of messages at one of 300a and 300d (for example, the number of messages at 300a) refers to the number of messages. In other words, the aggregated flow information is generated to not include the flow record of one of the first flow (for example, the first flow information) and the second flow (for example, the second flow information).

As mentioned above, the observer may include Ethernet switch 300a (one example of the first observer) and Ethernet switch 300d (one example of the second observer). Communicator 103 of TCU 100 obtains, from Ethernet switch 300a, the first flow information collected from the message received by Ethernet switch 300a, and obtains, from Ethernet switch 300d, the second flow information collected from the message received by Ethernet switch 300d. Subsequently, flow aggregator 104 of TCU 100 may determine whether the flow identification information of the flow record (one example of the first flow record) included in the first flow information and the flow identification information of the flow record (one example of the second flow record) included in the second flow record are identical, and when the determination result is that these are identical, exclude one of the flow record included in the first flow information and the flow record included in the second flow information in generating the aggregated flow information.

Each flow information includes information (one example of the observer identification information) identifying an Ethernet switch that has collected the flow information. Furthermore, flow aggregator 104 may add the observer identification information included in one of the first flow information and the second flow information (for example, the second flow information) to the other of the first flow information and the second flow information (for example, the first flow information).

Thus, it is possible to aggregate the flow information while leaving the information of the collection points. The correction points are used, for example, in analysis in an external server in which the aggregated flow information is used.

Note that the identical flows are not limited to having the same source IP address, the same destination IP address, the same source port, the same destination port, and the same transport protocol; for example, flows sharing a predetermined number of items among these may be regarded as being identical.

Note that the foregoing describes an example in which two flow information items are aggregated, but the number of flows to be aggregated may be three or more.

[1.10 Process Flowchart of Second Flow Aggregation Method]

Figure 11:
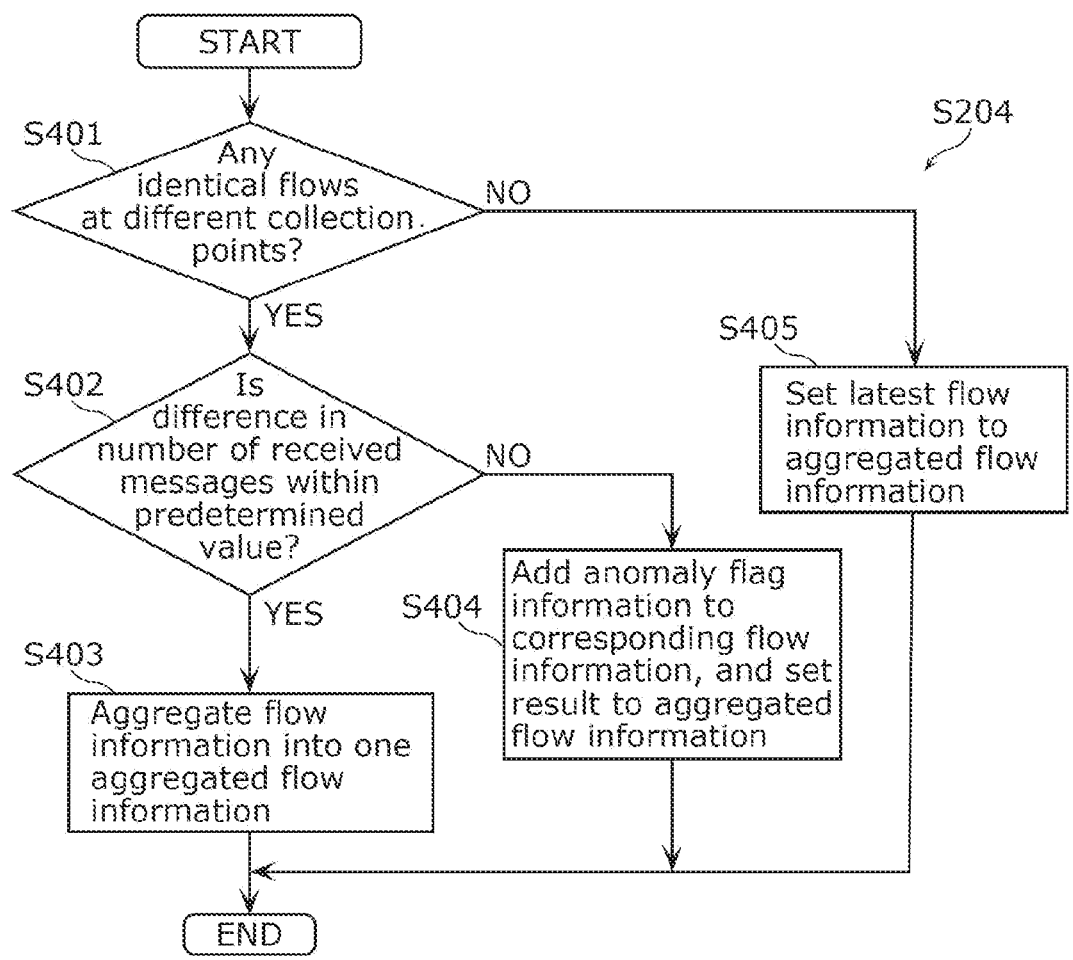
FIG. 11 is a flowchart of a second flow aggregation method for a TCU according to Embodiment 1.

FIG. 11 is a flowchart of the second flow aggregation method for TCU 100 according to the present embodiment. FIG. 11 is a flowchart illustrating another processing method (the second flow aggregation method) in a variation of the flow aggregation in Step S204 illustrated in FIG. 8. The processes illustrated in FIG. 11 are performed, for example, by flow aggregator 104 and flow verifier 105.

Flow verifier 105 of TCU 100 checks (determines) whether the latest flow information includes the same flows (identical flows) at different collection points (S401).

When identical flows are found at different collection points (for example, different Ethernet switches) (YES in S401), flow verifier 105 checks whether the difference in the number of received messages in the corresponding flow information is within a predetermined value (for example, 100) (S402). Determining whether the difference is within the predetermined value is one example of determining whether the predetermined relationship is satisfied.

When flow verifier 105 determines that there are no identical flows at different collection points (NO in S401), flow aggregator 104 of TCU 100 sets the latest flow information to the aggregated flow information (S405) and ends the processing.

When flow verifier 105 determines that there are identical flows at different collection points (YES in S401) and the difference in the number of received messages is within the predetermined value (YES in S402), flow aggregator 104 of TCU 100 aggregates the corresponding flow information into one flow information as aggregated flow information (S403) and ends the processing.

When flow verifier 105 determines that there are identical flows at different collection points (YES in S401) and the difference in the number of received messages is not within the predetermined value (NO in S402), flow verifier 104 of TCU 100 adds an anomaly flag information to the corresponding flow information, sets the result to the aggregated flow information (S404), and ends the processing.

Figure 12:
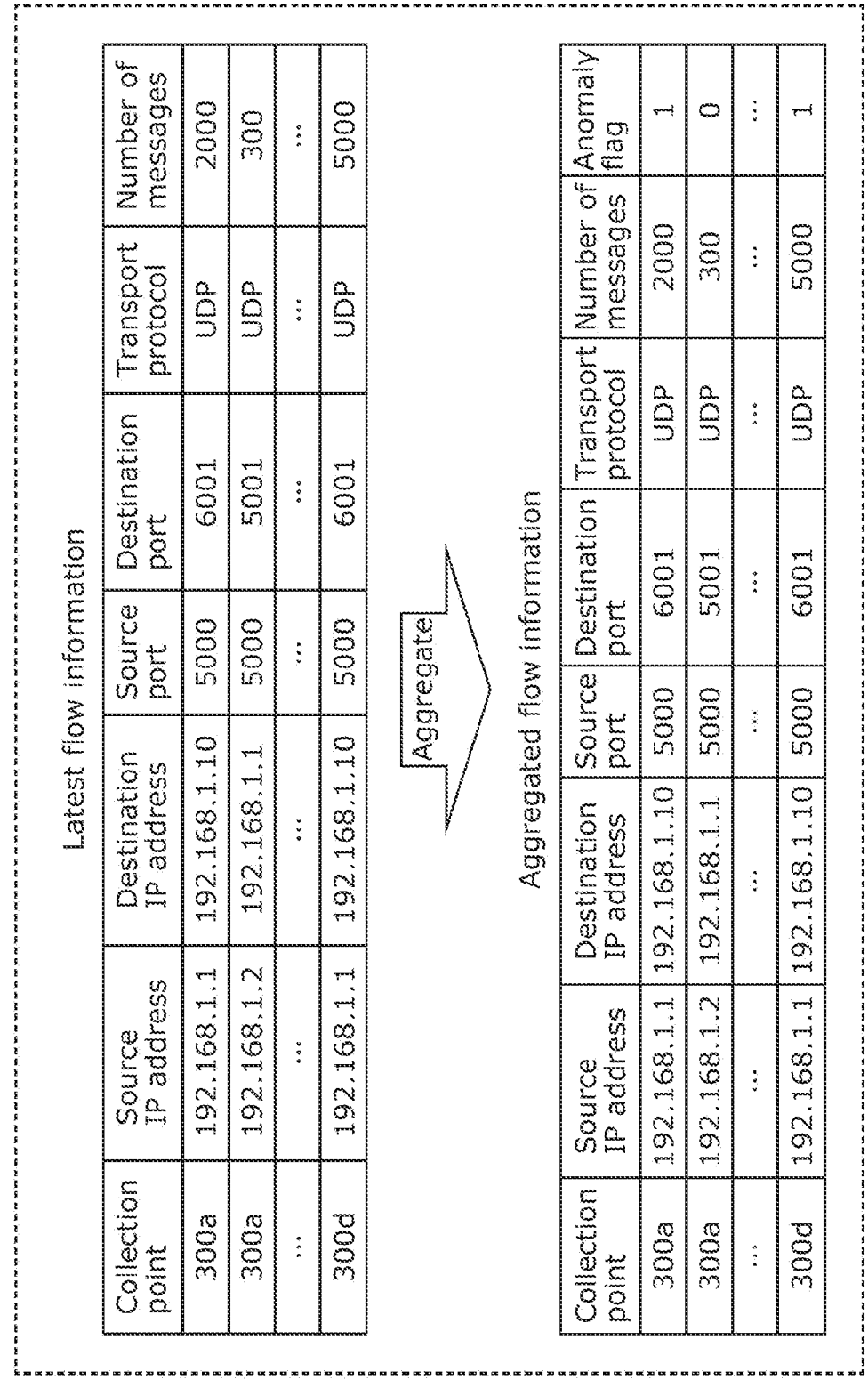
FIG. 12 is a diagram illustrating an output example of aggregated flow information obtained by a second flow aggregation method according to Embodiment 1.

FIG. 12 is a diagram illustrating an output example of the aggregated flow obtained by the second flow aggregation method. FIG. 12 illustrates the aggregated flow that is output by the second flow aggregation method when the number of messages in the fourth row in the latest flow information illustrated in FIG. 5 is 5000. In FIG. 12, although the flows in the first and fourth rows in the latest flow information are identical, the difference in the number of messages between these flows is 3000, an anomaly flag is added to the aggregated flow information, and the anomaly flag for the corresponding flow information is "1". The anomaly flag is one example of the anomaly identification flag.

Thus, the aggregated flow information may be information obtained by adding anomaly flag information to the latest flow information. Furthermore, even if there are identical flows, when the difference in the number of messages is not within the predetermined value, the flow information is not aggregated in generating the aggregated flow information.

Note that in FIG. 12, the anomaly flag for each of the identical flows is "1", but this is not limiting; it is sufficient that the anomaly flag for at least one of the identical flows be "1".

Note that, for example, when the results of Steps S401, S402 are YES, the anomaly flag is "0" which indicates that there is no anomaly.

Note that when more than one pair of identical flows is found, the processes in Steps S402 to S404 are performed for each pair of identical flows.

As mentioned above, the first statistical information includes the number of messages (one example of the statistic) based on the amount of received messages. When the flow identification information of the flow record included in the first flow information (one example of the first flow record) and the flow identification information of the flow record included in the second flow information (one example of the second flow record) are identical and furthermore, the first reception amount included in the first flow information and the second reception amount included in the second flow information satisfy a predetermined relationship, flow aggregator 104 may exclude one of the flow record included in the first flow information and the flow record included in the second flow information in generating the aggregated flow information.

In other words, when the flow identification information of the first flow record included in the first flow information collected at Ethernet switch 300a and the flow identification information of the second flow record included in the second flow information collected at Ethernet switch 300d are identical and furthermore, the reception amount corresponding to the first flow record and the reception amount corresponding to the second flow record do not satisfy a predetermined relationship, flow aggregator 104 outputs aggregated flow information including the first flow record and the second flow record.

When the first reception amount and the second reception amount do not satisfy the predetermined relationship, flow aggregator 104 may further add, to at least one of the first flow record and the second flow record, an anomaly identification flag indicating the presence of an anomaly. For example, flow aggregator 104 may add the anomaly identification flag to both the first flow record and the second flow record.

The predetermined relationship may include a condition that the difference between the first reception amount and the second reception amount (for example, the difference in the number of messages) is within a predetermined value.

[1.11 Process Flowchart of Third Flow Aggregation Method]

Figure 13:
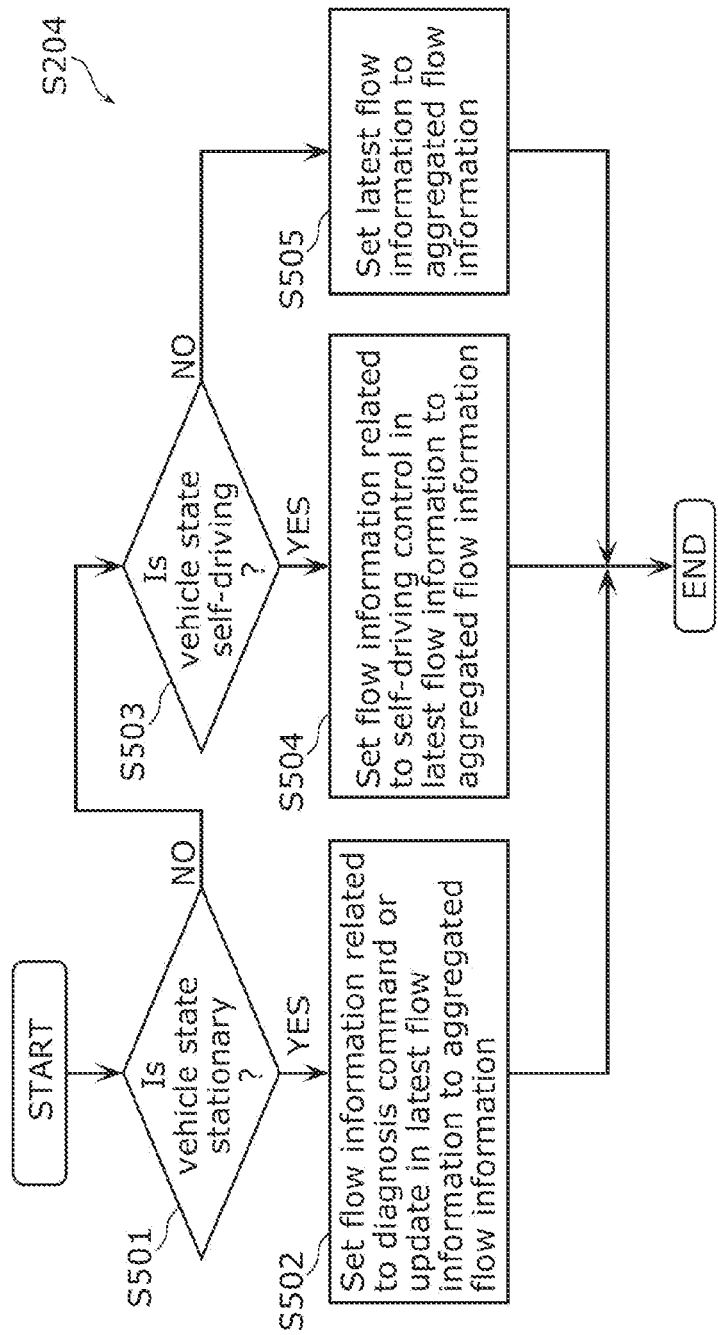
FIG. 13 is a flowchart of a third flow aggregation method for a TCU according to Embodiment 1.

FIG. 13 is a flowchart of the third flow aggregation method for TCU 100 according to the present embodiment. FIG. 13 is a flowchart illustrating yet another processing method (the third flow aggregation method) in a variation of the flow aggregation in Step S204 illustrated in FIG. 8. The processes illustrated in FIG. 13 are performed, for example, by flow aggregator 104. Flow aggregator 104 also functions as the vehicle state determiner.

TCU 100 checks (determines) whether the vehicle state is stationary (S501). TCU 100 may determine, for example, on the basis of the speed of vehicle 10, whether the vehicle state is stationary.

When the vehicle state is stationary (YES in S501), TCU 100 sets flow information related to a diagnosis command or update of firmware or the like in the latest flow information to the aggregated flow information (S502) and ends the processing. In Step S502, TCU 100 extracts only the flow information related to update in the latest flow information and generates the aggregated flow information, for example.

When the vehicle state is not stationary (NO in S501), TCU 100 checks whether the vehicle state is self-driving (S503). TCU 100 may determine, for example, on the basis of whether a message related to self-driving control has been transmitted or received in the in-vehicle network monitoring system, whether the vehicle state is self-driving.

When the vehicle state is self-driving (YES in S503), TCU 100 sets flow information related to self-driving control in the latest flow information to the aggregated flow information (S504) and ends the processing. In Step S504, TCU 100 extracts only the flow information related to self-driving control in the latest flow information and generates the aggregated flow information, for example.

When the vehicle state is not self-driving (NO in S503), TCU 100 sets the latest flow information to the aggregated flow information (S505) and ends the processing. In Step S505, TCU 100 generates aggregated flow information including the entire flow information included in the latest flow information, for example. Note that examples in which the result of S503 is NO include driving by a human driver and battery charging.

Figure 14:
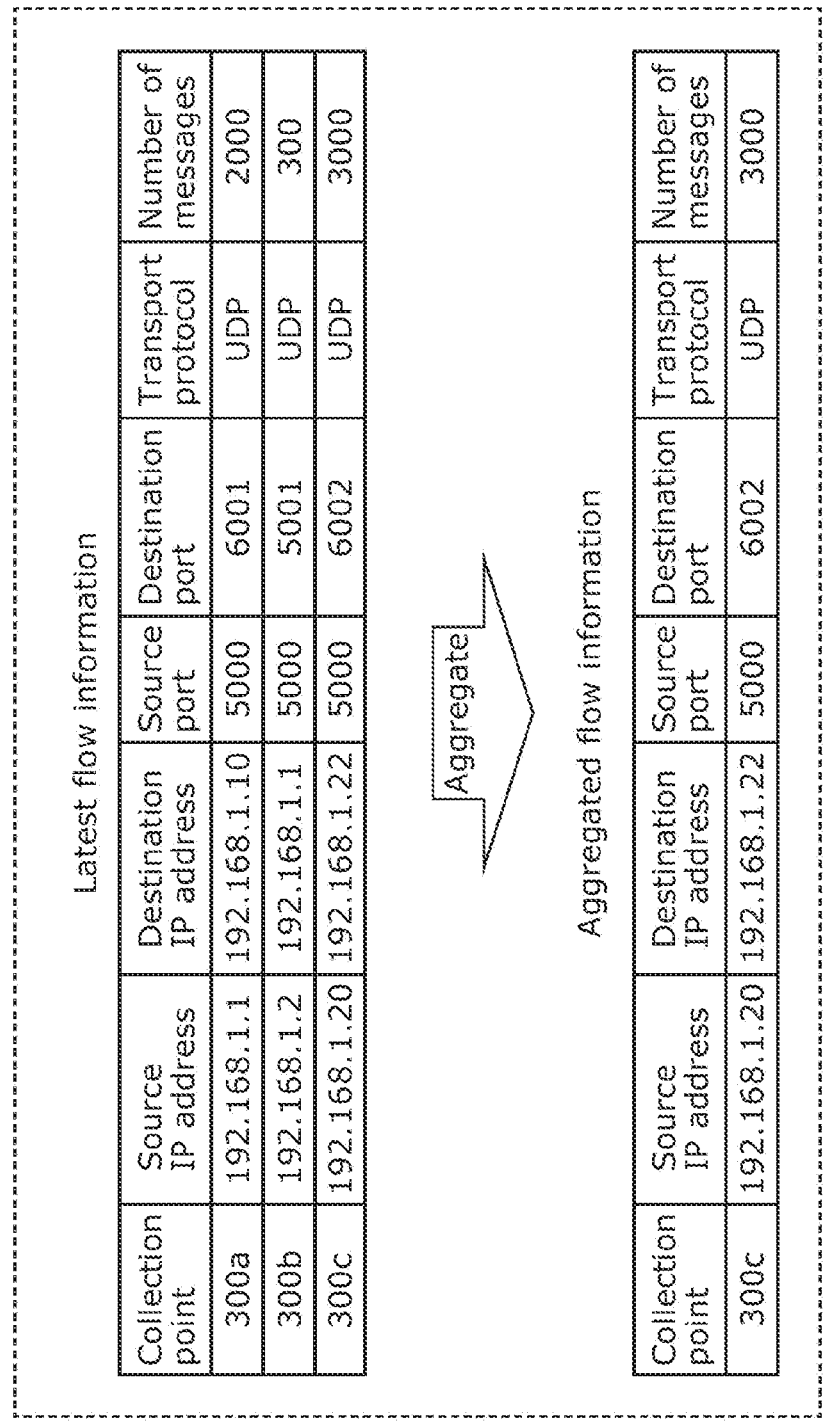
FIG. 14 is a diagram illustrating an output example of aggregated flow information obtained by a third flow aggregation method according to Embodiment 1.

FIG. 14 is a diagram illustrating an output example of the aggregated flow obtained by the third flow aggregation method. FIG. 14 illustrates an example in which a flow related to information system communication is held in the first row, a flow related to body system control communication is held in the second row, and a flow related to self-driving control communication is held in the third row in the latest flow information. Assume that at this time, the vehicle state stored in vehicle state holder 107 of TCU 100 is self-driving.

Flow aggregator 104 of TCU 100 extracts only the flow related to self-driving control (the flow information collected at 300c) from the latest flow information and generates aggregated flow information including the extracted flow information. FIG. 14 illustrates an example in which as a result of flow aggregation, only the flow related to self-driving control communication in the third flow is output as aggregated flow.

As mentioned above, TCU 100 includes flow aggregator 104 (one example of the vehicle state determiner) which determines the vehicle state of vehicle 10. Flow aggregator 104 may further perform, on the basis of the vehicle state, at least one of the following: (i) selecting at least one of the one or more flow records; (ii) adding the second statistical information; and (iii) deleting at least one of the one or more flow records.

Furthermore, the vehicle state may include one of the state of being stationary and the state of self-driving.

Furthermore, when the vehicle state is stationary, flow aggregator 104 may select a flow record related to at least one of a diagnosis command and an update command from among one or more flow records and generate aggregated flow information including the selected flow record. When the vehicle state is self-driving, flow aggregator 104 may select a flow record related to self-driving control from among the one or more flow records and generate aggregated flow information including the selected flow record. When the vehicle state is neither stationary nor self-driving, flow aggregator 104 may generate aggregated flow information including one or more flow information items obtained. Furthermore, as determination of the vehicle state, flow aggregator 104 may determine a vehicle state including one of the state of being stationary and the state of traveling.

[1.12 Advantageous Effects of Embodiment 1]

TCU 100 according to the present embodiment collects network communication logs (flow information) reported from flow collectors 302 of Ethernet switches disposed in an in-vehicle network and when the flow information collected at one point and the flow information collected at a different point are identical, aggregates the information. Thus, it is possible to aggregate redundant information such as messages transferred in the in-vehicle network, allowing the communication logs to be reduced.

Furthermore, flow aggregator 104 checks the consistency between the flow information collected at one point and the flow information collected at a different point and adds an anomaly flag to the flow information that is not consistent with the aggregated flow information. This makes it possible to detect an anomaly that is difficult to detect in the flow information collected at one point, allowing easy checking of anomalous flow information using the aggregated flow information.

Furthermore, flow aggregator 104 selects the aggregated flow information on the basis of the current vehicle state and the flow information collected at different points. This makes it possible to check more appropriate flow information alone according to the state of the vehicle, allowing in-vehicle network communication logs to be reduced.

Thus, TCU 100 according to the present embodiment can properly aggregate communication logs according to at least one of the presence or absence of identical flows, the anomaly detection, and the vehicle state in the in-vehicle network system.

Embodiment 2

The following describes a network communication log aggregation device (communication log aggregation device) to be used in a vehicle with an in-vehicle network (in-vehicle network system) in which two or more electronic control units (ECUs) communicate with each other via Ethernet. Note that structural elements having substantially the same functions as those according to Embodiment 1 are assigned substantially the same reference signs and description of the structural elements will be omitted.

[2.1 Configuration of In-vehicle Network Monitoring System]

Figure 15:
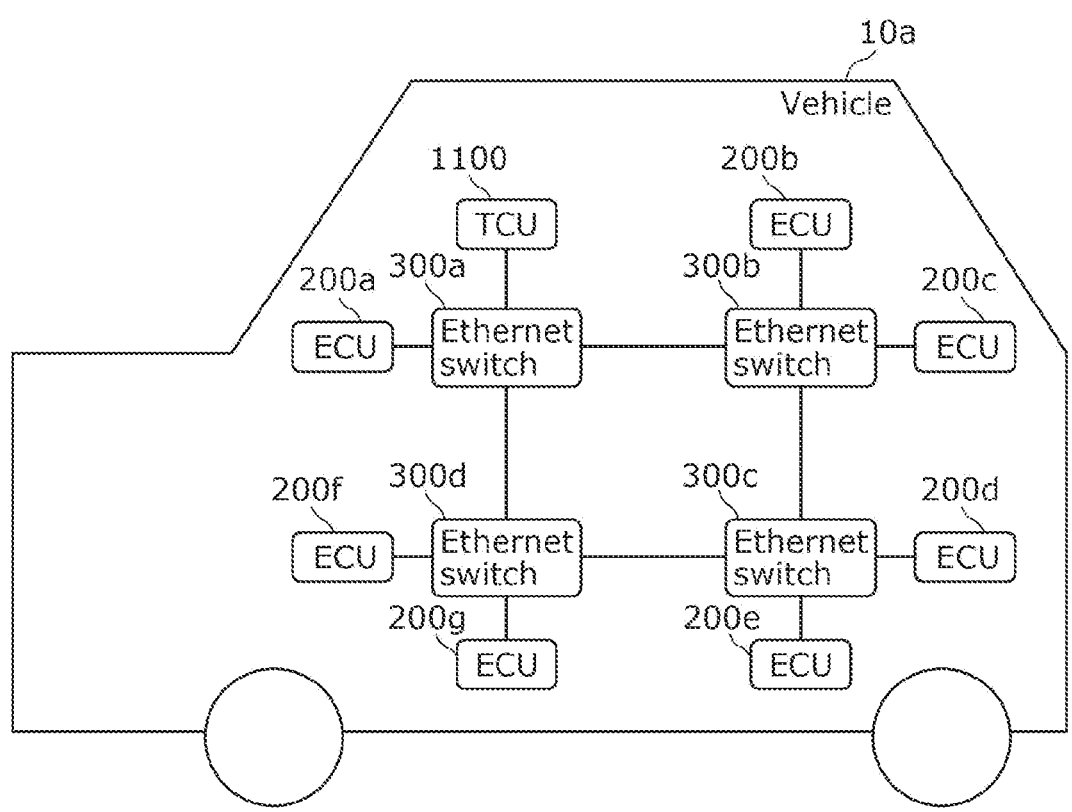
FIG. 15 is a configuration diagram of an in-vehicle network monitoring system according to Embodiment 2.

FIG. 15 is a configuration diagram of an in-vehicle network monitoring system according to the present embodiment. The in-vehicle network monitoring system is installed in vehicle 10a, The in-vehicle network monitoring system is one example of the control network system.

As illustrated in FIG. 15, the in-vehicle network monitoring system includes TCU 1100, ECU 200a, ECU 200b, ECU 200c, ECU 200d, ECU 200e, ECU 200f, ECU 200g, Ethernet switch 300a, Ethernet switch 300b, Ethernet switch 300c, and Ethernet switch 300d. TCU 1100, which includes an interface for connecting to an external network, communicates with an external server, for example.

[2.2 Configuration Diagram of TCU]

Figure 16:
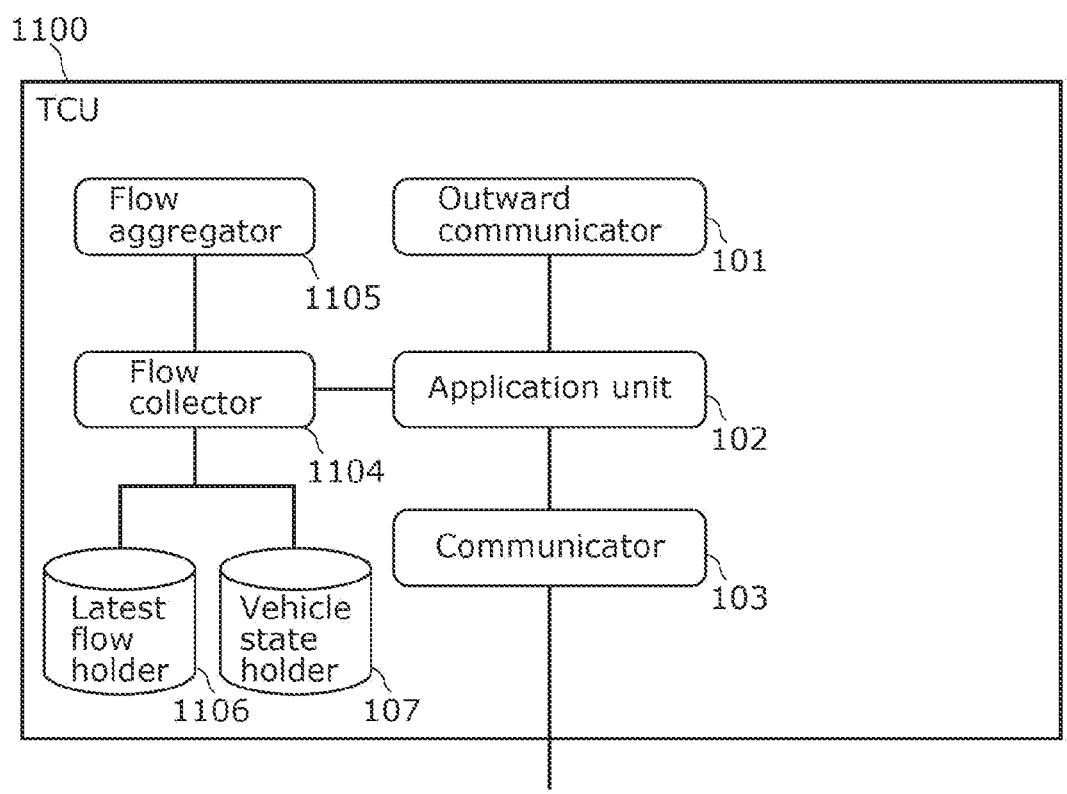
FIG. 16 is a configuration diagram of a TCU according to Embodiment 2.

FIG. 16 is a configuration diagram of TCU 1100 according to the present embodiment.

As illustrated in FIG. 16, TCU 1100 includes outward communicator 101, application unit 102, communicator 103, flow collector 1104, flow aggregator 1105, latest flow holder 1106, and vehicle state holder 107.

Flow collector 1104 monitors communication in an internal network that is performed by communicator 103, communication between applications in application unit 102, and messages in communication performed by outward communicator 101, and collects flow information on the basis of header information included in the messages.

The flow information is defined by a combination of a source IP address, a destination IP address, a source port number, a destination port number, and a transport protocol which are included in a message, for example. Furthermore, the flow information includes flow statistical information such as the number of observed messages and total bytes of messages.

Flow collector 1104 holds the collected flow information in latest flow holder 1106.

Furthermore, flow collector 1104 updates, on the basis of the report from application unit 102, the vehicle state stored in vehicle state holder 107.

Flow aggregator 1105 outputs the aggregated flow information at a predetermined interval with reference to latest flow holder 1106 in which the flow collected by flow collector 1104 is stored and the vehicle state stored in vehicle state holder 107. Note that referring to the vehicle state is not essential.

The aggregated flow information is reported via outward communicator 101 to an external server installed outside the vehicle, for example, as a communication log of the in-vehicle network.

After the flow aggregation, flow aggregator 1105 updates the flow information stored in latest flow holder 1106.

Latest flow holder 1106 holds the flow information collected by flow collector 1104. Detailed description of the latest flow information will be provided later.

[2.3 One Example of Latest Flow Information]

FIG. 17 is a diagram illustrating one example of the latest flow information according to the present embodiment. The latest flow information is stored in latest flow holder 1106.

FIG. 17 illustrates an example in which the number of received messages and the number of previous messages are held for each flow. Note that in FIG. 17, communication with an external network (external communication) is referred to as "External", communication between applications (app-to-app communication) is referred to as "App-to-app", and communication in an internal network (internal communication) is referred to as "Internal".

As illustrated in FIG. 17, each flow of the latest flow information includes the location at which the flow information is collected (the collection point), specifically, information identifying whether the communication is communication with an external network, communication between applications, or communication in an internal network, information for specifying the flow (a combination of a source IP address, a destination IP address, a source port number, a destination port number, and a transport protocol), the number of received messages, and the number of previous messages. As the number of previous messages, the number of messages obtained at the time of the previous flow aggregation is held.

The number of messages indicated in FIG. 17 is one example of the first statistical information, and the number of previous messages indicated in FIG. 17 is one example of the first statistical information that has previously been obtained. Note that the number of previous messages may be the first statistical information obtained in the past. The first statistical information obtained in the past may be, for example, the mean value of two or more first statistical information items obtained in the past.

The figure shows that regarding the flow in the first row, the collection point is "an external network (External)", the source IP address is "200.200.200.10", the destination IP address is "100.100.100.10", the source port number is "80", the destination port number is "50100", the transport protocol is "TCP", the number of received messages is "100", and the number of previous messages is "0".

The figure shows that regarding the flow in the second row, the collection point is "an external network (External)", the source IP address is "100.100.100.10", the destination IP address is "200.200.200.10", the source port number is "50100", the destination port number is "80", the transport protocol is "TCP", the number of received messages is "50", and the number of previous messages is "0".

The figure shows that regarding the flow in the third row, the collection point is "communication between applications (App-to-app)", the source IP address is "127.0.0.1", the destination IP address is "127.0.0.1", the source port number is "50000", the destination port number is "50001", the transport protocol is "UDP", the number of received messages is "10", and the number of previous messages is "9".

Illustration of flow information in the middle is omitted in the figure; regarding the flow in the last row, the collection point is "an internal network (Internal)", the source IP address is "192.168.1.1", the destination IP address is "192.168.1.10", the source port number is "5000", the destination port number is "6001", the transport protocol is "UDP", the number of received messages is "2000", and the number of previous messages is "2000".

Note that information identifying whether the communication is communication with an external network, communication between applications, or communication in an internal network is obtained, for example, using the observers. For example, messages obtained by external communicator 101 are subject to the first determination that is communication with an external network, messages exchanged between applications inside application unit 102 are subject to the second determination that is communication between applications, and messages transmitted and received in an internal network are subject to the third determination that is communication in the internal network. For example, outward communicator 101 is one example of the third observer which performs the first determination, application unit 102 is one example of the fourth observer which performs the second determination, and communicator 103 is one example of the fifth observer which performs the third determination.

Thus, TCU 1100 may include: a third observer which observes communication with an external network; a fourth observer which observes communication between applications; and a fifth observer which observes communication in an internal network. Note that the third to fifth observers may be provided as one structural element, for example, as flow collector 1104.

Note that the number of previous messages indicated in FIG. 17 may be included in the latest flow information illustrated in FIG. 5 according to Embodiment 1, for example.

[2.4 Flow Collection Flowchart]

Figure 18:
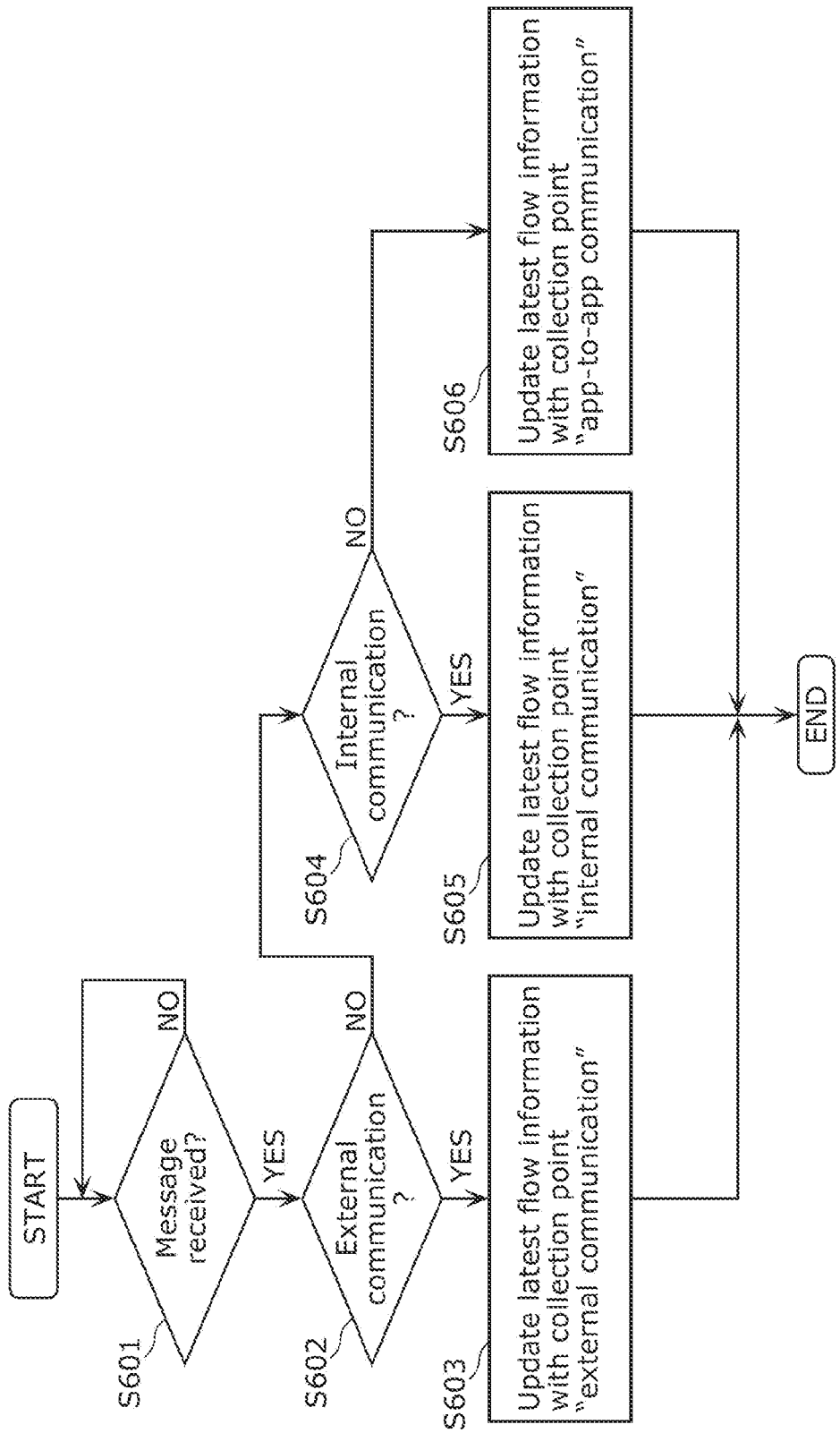
FIG. 18 is a flow collection flowchart for a TCU according to Embodiment 2.

FIG. 18 is a flow collection flowchart for TCU 1100 according to the present embodiment. FIG. 18 is a flowchart illustrating a flow collection process performed by flow collector 1104 in TCU 1100.

As illustrated in FIG. 18, TCU 1100 checks (determines) whether a message has been received (S601). When a message has been received (YES in S601), TCU 1100 performs Step S602. When a message has not been received (NO in S601), TCU 1100 waits until a message is received (resume S601). Note that the message is received by one of outward communicator 101, application unit 102, and communicator 103, for example.

Next, when a message is received (YES in S601), TCU 1100 checks whether the received message is a message observed in external communication (S602).

When the message has been received in external communication (YES in S602), TCU 1100 sets "external communication" to the collection point and updates the latest flow information (S603), and ends the processing. Flow collector 1104 stores the flow defined by the collection point "external communication" into latest flow holder 1106 as latest flow information.

When the received message is not a message observed in external communication (NO in S602), TCU 1100 checks whether the received message is a message observed in internal communication (S604).

When the received message is a message observed in internal communication (YES in S604), TCU 1100 sets "internal communication" to the collection point, updates the latest flow information (S605), and ends the processing. Flow collector 1104 stores the flow defined by the collection point "internal communication" into latest flow holder 1106 as latest flow information.

When the received message is not a message observed in internal communication (NO in S604), TCU 1100 sets "app-to-app communication" to the collection point, updates the latest flow information (S606), and ends the processing. Flow collector 1104 stores the flow defined by the collection point "app-to-app communication" into latest flow holder 1106 as latest flow information.

[2.5 Flow Information Aggregation Flowchart]

Figure 19:
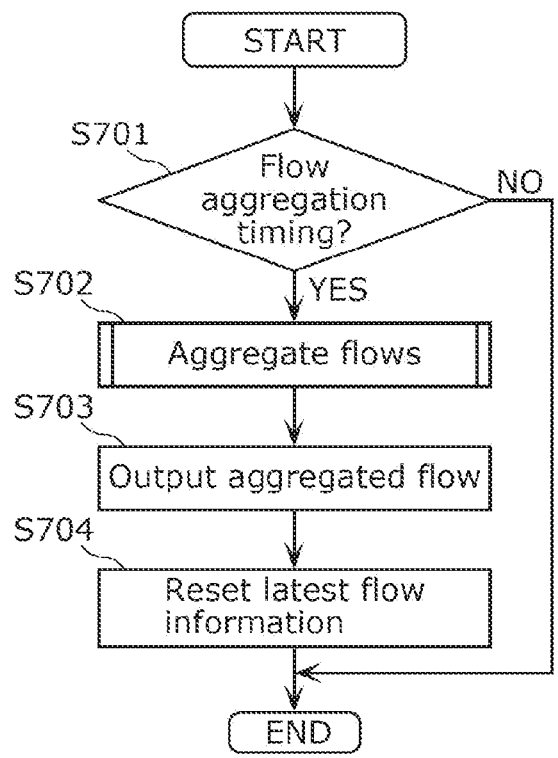
FIG. 19 is a flow information aggregation flowchart for a TCU according to Embodiment 2.

FIG. 19 is a flow information aggregation flowchart for TCU 1100 according to the present embodiment. FIG. 19 is a flowchart of processes in which flow collector 1105 in TCU 1100 aggregates the flow information.

As illustrated in FIG. 19, TCU 1100 determines whether the current point in time is a flow aggregation timing that comes at a predetermined interval (S701). When the current point in time is not the flow aggregation timing (NO in S701), TCU 1100 ends the processing.

When the current point in time is the flow aggregation timing (YES in S701), TCU 1100 performs the process of aggregating the flow information on the basis of the latest flow information stored in latest flow holder 1106 and the vehicle state stored in vehicle state holder 107 (S702).

Subsequently, TCU 1100 outputs the flow information that has been aggregated (S703), resets the latest flow information stored in latest flow holder 1106 (S704), and ends the processing.

In resetting the latest flow information, specifically, the processes of updating the number of previous messages with the number of messages (the number of current messages) and setting the number of messages (the number of next messages) to zero are performed. Furthermore, in resetting the latest flow information, the flow information in which the number of messages is zero may be deleted.

[2.6 Flow Aggregation Process Flowchart]

Figure 20:
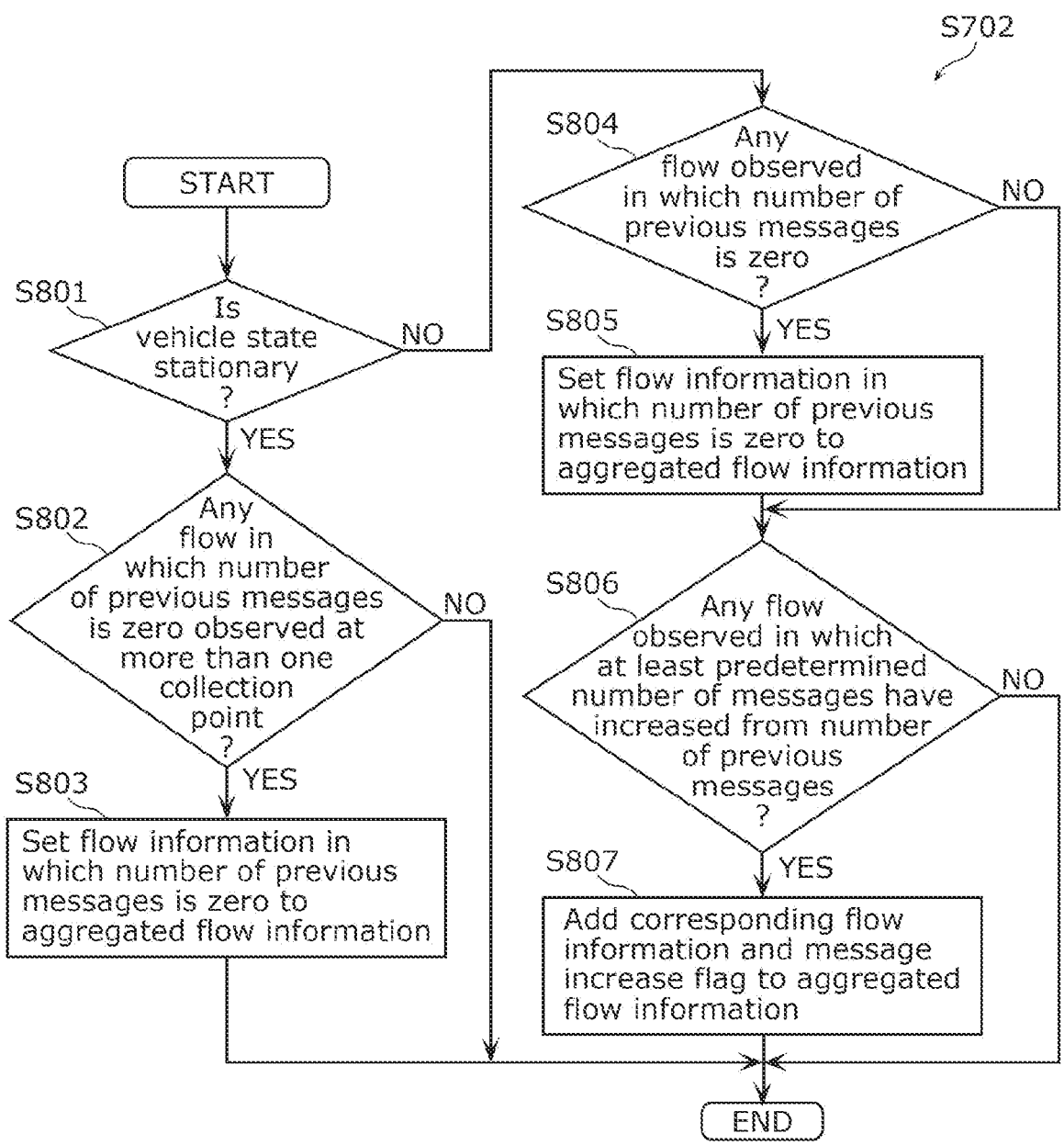
FIG. 20 is a detailed flowchart of a flow aggregation process according to Embodiment 2.

FIG. 20 is a detailed flowchart of the flow aggregation process according to the present embodiment. FIG. 20 is a flowchart specifically showing the flow aggregation process (S702) illustrated in FIG. 19. The processes illustrated in FIG. 20 are performed, for example, by flow aggregator 1105.

As illustrated in FIG. 20, TCU 1100 checks (determines) whether the current vehicle state is stationary (S801).

When the vehicle state is stationary (YES in S801), TCU 1100 performs Step S802, and when the vehicle state is not stationary (NO in S801), TCU 1100 performs Step S804.

When the vehicle state is stationary in Step S801 (YES in S801), TCU 1100 checks whether a flow in which the number of previous messages is zero has been observed at more than one collection point, that is, whether a flow that has not been observed at the previous time is observed at the current time (S802).

When a flow in which the number of previous messages is zero has been observed at more than one collection point (YES in S802), TCU 1100 sets the flow information in which the number of previous messages is zero to the aggregated flow information (S803), and ends the processing. When a flow in which the number of previous messages is zero has not been observed at more than one collection point (NO in S802), the processing ends. This means that the aggregated flow information is empty.

When the vehicle state is not stationary in Step S801 (NO in S801), TCU 1100 checks whether a flow in which the number of previous messages is zero has been observed (S804). For example, in Step S804, it is checked whether a flow in which the number of previous messages is zero has been observed at one collection point. The number of flows in which the number of previous messages is zero, observed in Step S804, is less than the number of flows in which the number of previous messages is zero, observed in Step S802, for example, but this is not limiting.

Thus, when the vehicle state is not stationary, that is, when vehicle 10a is traveling, even if the number of observed flows in which the number of previous messages is zero is small, aggregated flow information can be generated. Accordingly, it is possible to transmit the aggregated flow information to an external server or the like in a shorter time.

When a flow in which the number of previous messages is zero has been observed (YES in S804), TCU 1100 sets the flow information in which the number of previous messages is zero to the aggregated flow information (S805) and performs Step S806.

When a flow in which the number of previous messages is zero has not been observed (NO in S804), TCU 1100 performs Step S806, Next, TCU 1100 compares the number of previous messages and the number of messages and checks whether there is any flow in which at least a predetermined number of (for example, 100) messages has increased (S806). The result of comparison between the number of previous messages and the number of messages may be obtained, for example, by calculating the difference between the number of previous messages and the number of messages; this difference is one example of the difference information.

When there is such a flow (YES in S806), TCU 1100 adds the corresponding flow information to the aggregated flow information, further adds information of a message increase flag to the corresponding flow information (S807), and ends the processing.

When there is no such a flow (NO in S806), TCU 1100 ends the processing.

As mentioned above, one or more flow information items further include the number of previous messages (one example of the first statistical information that has previously been obtained). Flow aggregator 1105 according to the present embodiment generates aggregated flow information on the basis of the vehicle state of vehicle 10a and difference information that is the difference between the number of messages and the number of previous messages.

Figure 21:
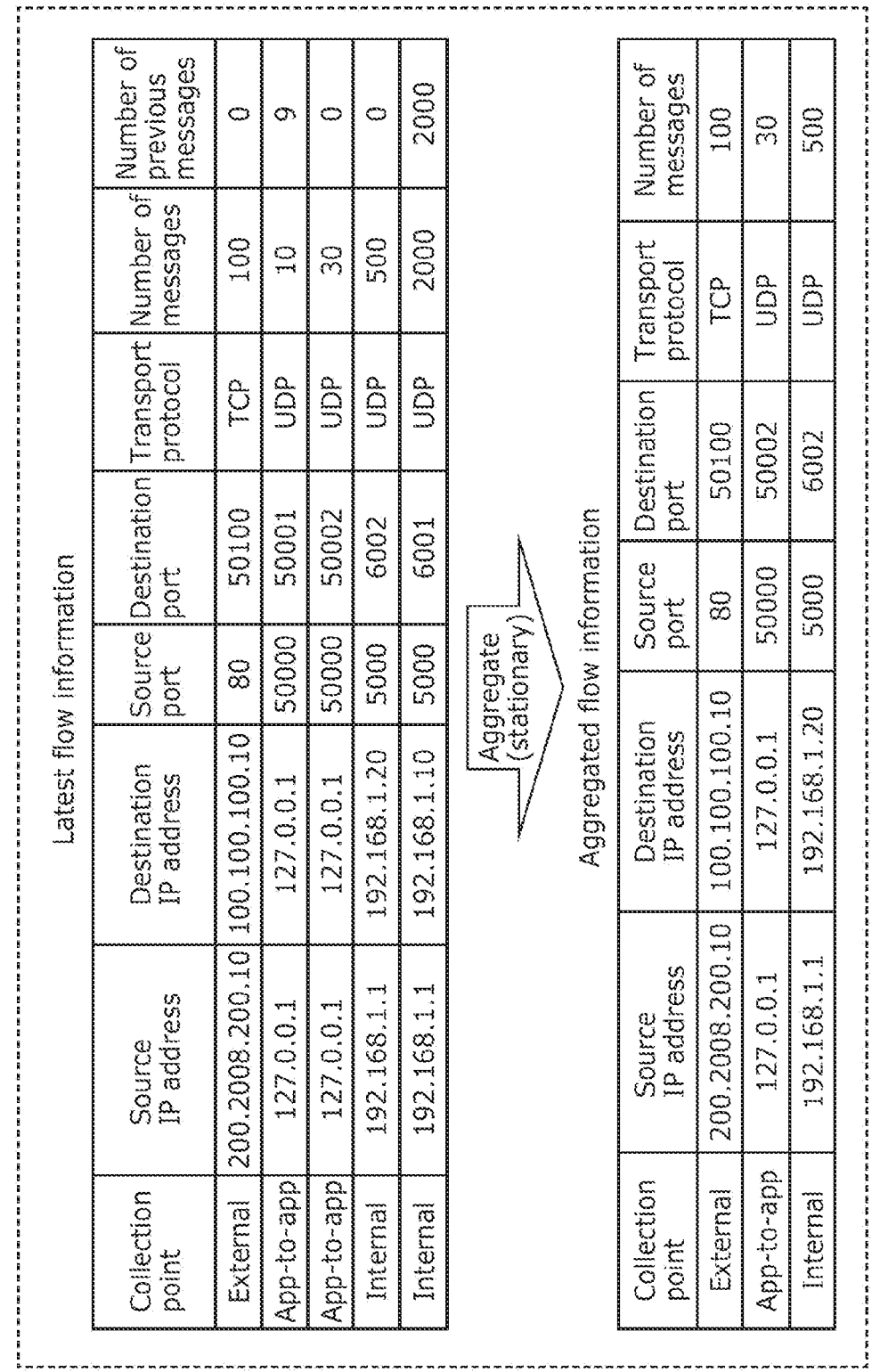
FIG. 21 is a diagram illustrating an output example of aggregated flow information (obtained while a vehicle is stationary) according to Embodiment 2.
Figure 22:
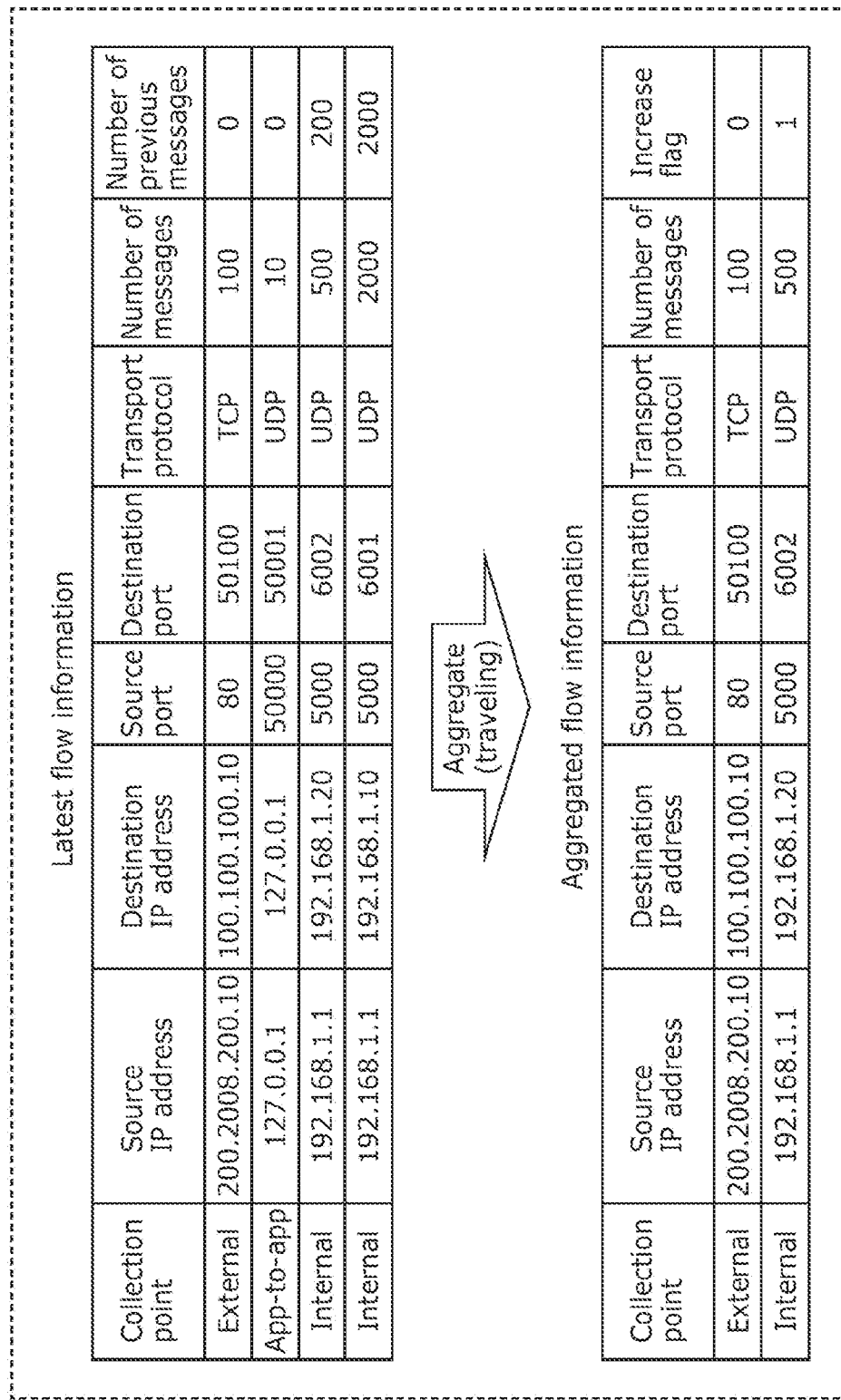
FIG. 22 is a diagram illustrating an output example of aggregated flow information (obtained while a vehicle is traveling) according to Embodiment 2.

Here, output examples of the aggregated flow information are illustrated in FIG. 21 and FIG. 22. FIG. 21 is a diagram illustrating an output example of the aggregation flow information (obtained while the vehicle is stationary) according to the present embodiment. FIG. 22 is a diagram illustrating an output example of the aggregation flow information (obtained while the vehicle is traveling) according to the present embodiment. Note that traveling may be self-driving or may be driving by a human driver.

FIG. 21 illustrates the output example of the aggregated flow information for the latest flow information stored in latest flow holder 1106 when the vehicle state is stationary. In the example illustrated in FIG. 21, there are five flow information items as the latest flow information, the number of previous messages in the flow information in the first, third, and fourth rows is zero, and at three collection points, namely, "external", "app-to-app", and "internal", there is flow information in which the number of previous messages is zero; thus, information obtained by removing the information of the number of previous messages from the flow information in the first, third, and fourth rows of the latest flow information is output as the aggregated flow information.

In Step S803, flow aggregator 1105 extracts, from the latest flow information illustrated in FIG. 21, flow information in which the number of previous messages is "0", and generates aggregated flow information including the extracted flow information. In other words, flow aggregator 1105 generates aggregated flow information including flow information that has not been observed at the previous flow aggregation time, but has been observed at the current flow aggregation time.

FIG. 22 illustrates the output example of the aggregated flow information for the latest flow information stored in latest flow holder 1106 when the vehicle state is traveling. In the example illustrated in FIG. 22, there are four flow information items as the latest flow information, the first row includes flow information in which the number of previous messages is zero, and the third row includes flow information in which the number of messages is greater than the number of previous messages by at least 100. Therefore, the information of the number of previous messages is removed from the first and third rows of the latest flow information, furthermore the information of an increase flag is added (0 to the flow in the first row of the latest flow information and 1 to the flow in the third row of the latest flow information), and the result is output as the aggregated flow information.

In Steps S805 and S807, flow aggregator 1105 generates, from the latest flow information illustrated in FIG. 22, aggregated flow information including flow information in which the number of previous messages is "0" and flow information in which the increment between the number of previous messages and the number of current messages is greater than or equal to the predetermined number. The increase flag "0" is added to the flow information in which the number of previous messages is "0", and the increase flag "1" is added to the flow information in which the increment is greater than or equal to the predetermined number. In other words, the aggregated flow information identifying the flow information in which the number of previous messages is "0" and the flow information in which the increment is greater than or equal to the predetermined number is transmitted to an external server.

Note that although the example in which the aggregated flow information including the flow information in which the increment between the number of previous messages and the number of current messages is greater than or equal to the predetermined number is generated has thus far been described with reference to FIG. 20 to FIG. 22, flow aggregator 1105 may generate aggregated flow information including flow information in which the decrement between the number of previous messages and the number of current messages is greater than or equal to a predetermined number. For example, flow aggregator 1105 may generate aggregated flow information including flow information in which the difference between the number of previous messages and the number of current messages is greater than or equal to a predetermined number. Furthermore, in this case, different increase flags are added to flow information in which the increment between the number of previous messages and the number of current messages is greater than or equal to a predetermined number and flow information in which the decrement between the number of previous messages and the number of current messages is greater than or equal to a predetermined number. Note that the predetermined number for determining the increment and the predetermined number for determining the decrement may be different values or may be the same value.

As mentioned above, when the vehicle state is stationary (YES in S801) and the number of third flow information items in which the number of previous messages (one example of the first statistical information that has previously been obtained) is zero and the number of current messages (one example of the first statistical information) is other than zero is greater than or equal to the first number (YES in S802), flow aggregator 1105 may generate aggregated flow information including the third flow information items (S803). When the vehicle state is not stationary (NO in S801) and the number of fourth flow information items in which the number of previous messages is zero and the number of current messages is other than zero is greater than or equal to the second number less than the first number, flow aggregator 1105 may generate aggregated flow information including the fourth flow information items (S805).

Moreover, flow aggregator 1105 may further add different flags to the third flow information and the fourth flow information.

[Other Variations]

Note that the present disclosure has thus far been described on the basis of the foregoing embodiments, but it goes without saying that the present disclosure is not limited to the foregoing embodiments. The following examples are also intended to be included in the present disclosure.

(1) The foregoing embodiments have described examples in which Ethernet is used in the in-vehicle network, but this is not limiting; CAN, CAN-FD (flexible data-rate), Ethernet, LIN, or FlexRay may be used, and a combination thereof may also be used.

(2) The flow information is aggregated in the TCU in the foregoing embodiments, but does not need to be aggregated in the TCU. For example, the flow information may be aggregated in a head unit, a central ECU, or an Ethernet switch, or may be sent to a server and flows may be aggregated in the server. Furthermore, flows may be aggregated at more than one point in the in-vehicle network. This makes it possible to aggregate flows in a hierarchical manner; this is effective in reducing network traffic accompanied by communication log transmission.

(3) The foregoing embodiments have described an example of the flow information as a network communication log, but the communication format of the flow information is not limited. It is sufficient that communication messages in a network be classified as flows according to a predetermined rule and statistical information of the classified flows be included. For example, the communication format of the flow information may be internet protocol flow information export (IPFIX) or NetFlow.

(4) In the foregoing embodiments, a combination of the source IP address, the destination IP address, the source port number, the destination port number, and the transport protocol is used as information for specifying a flow, but this is not limiting. For example, the information to be used may be reduced or new information to be used may be added. The information to be added may be VLAN-ID which is used in a virtual LAN or an identifier included in the payload of an application layer. Thus, the flow has more flexible definition, making it possible to collect flow information appropriate for the network.

(5) The foregoing embodiments have described an example in which the number of messages is held as the flow information, but the flow information is not limited to the number of messages. For example, the flow information may include information such as total bytes of observed messages, communication time, communication start time, and communication end time. The total bytes and the communication time are one example of the statistical information. The anomaly flag to be added after the flow verification may be different from the anomaly flag. For example, the anomaly flag may be replaced by information indicating the type of the detected anomaly.

(6) The latest flow information is held in unencrypted form in the foregoing embodiments, but may be held in encrypted form. Similarly, the communication of the flow information may also be encrypted. This makes it possible to protect the flow information from interception.

(7) Handling of the aggregated flow information has not been mentioned in the foregoing embodiments; the aggregated flow information may be transmitted to an internal network, may be reported to an external server, or may be held in an internal element (for example, non-volatile memory) as a communication log.

(8) The TCU performs the flow aggregation process at a predetermined interval in the foregoing embodiments, but the timing for performing the flow aggregation process is not limited to that in the foregoing embodiments. For example, flows may be aggregated only at the point in time upon request, the flow aggregation process may be omitted according to the vehicle state, the flow aggregation timing may be changed according to the vehicle state, or the flow aggregation process may be performed upon reception of specific flow information.

(9) The foregoing embodiments have described an example in which the flow verifier adds the anomaly flag when the number of messages in the identical flows collected at different collection points is different depending on the collection points, but the method for adding the anomaly flag is not limited to this example. For example, messages sampling or the like may cause a change in the number of messages when the collection points are different. Therefore, the anomaly flag may be added when the relationship of the number of messages with sampling taken into consideration is not satisfied. Furthermore, an anomaly may be detected by another method. For example, rule-based or machine leaning anomaly detection methods may be combined to add the anomaly flag when an anomaly is detected in the flow information. This makes it possible to detect more various anomalies at the time of flow aggregation.

(10) The latest flow information is updated on the basis of the reported flow information or the messages observed at the predetermined interval in the foregoing embodiments, but the latest flow information may be normalized and held as information per unit of time. This enables comparison even when a period in which the flow information is collected varies among the collection points.

(11) The foregoing embodiments have described an example in which the aggregated flow information is output without any changes made thereto, but the aggregated flow information may further be reduced. For example, the aggregated flow information that has previously been output may be held so that only a difference is transmitted, a priority may be given according to the collection points, or flows may be grouped again on the basis of the VLAN-ID or other identifiers indicating flow attributes, in other words, flow information items with the same attribute may be output after being grouped and included into a message to be transmitted. Furthermore, this process may be performed only when the size of the aggregated flow exceeds a predetermined value.

(12) The foregoing embodiments have described an example in which information such as the anomaly flag and the increase flag is added to the aggregated flow information, but the adding of the information may be replaced by deleting of information. For example, the information of the collection point may be deleted, or information considered unnecessary may be deleted according to the aggregated flow information or the vehicle state.

(13) The type of flows to be aggregated is changed according to the vehicle state in the foregoing embodiments, but the flow information to be aggregated may be selected according to the collection points for flow information instead of the type of flows to be aggregated. The flow aggregator may generate aggregated flow information including flow information obtained from a specific Ethernet switch, for example. The specific Ethernet switch may be set in advance. Furthermore, according to the vehicle state, the flow aggregator may change the priority given to each of two or more collection points (observers). For example, when the vehicle state is self-driving (YES in S503), the flow aggregator may give a higher priority to flow information related to self-driving control than to the other flow information in the latest flow information.

Subsequently, on the basis of the changed priority, the flow aggregator may change the ratio of one or more flow records collected at two or more observers to be included in the aggregated flow information. In other words, the flow aggregator may change the selection ratio of the flow information included in the aggregated flow information. For example, when generating aggregated flow information including one or more first flow records obtained from the first Ethernet switch (for example, Ethernet switch 300a) and one or more second flow records obtained from the second Ethernet switch (for example, Ethernet switch 300d), the flow aggregator may change the selection ratio of the first flow records to the second flow records included in said aggregated flow information (for example, 8 to 2). For example, when the vehicle state is self-driving, the flow aggregator may generate aggregated flow information including a larger amount of flow information related to self-driving control than the other flow information in the latest flow information.

(14) Each of the devices according to the foregoing embodiments is specifically a computer system configured of a microprocessor, read only memory (ROM), random access memory (RAM), a hard disk unit, a display unit, a keyboard, and a mouse, for example. A computer program is recorded on the RAM or the hard disk unit. Each of the devices achieves its function as a result of the microprocessor operating according to the computer program. Here, the computer program is configured of a combination of command codes indicating commands to the computer in order to achieve a predetermined function.

(15) Some or all of the structural elements included in each of the devices according to the foregoing embodiments may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is recorded on the RAM. The system LSI achieves its function as a result of the microprocessor operating according to the computer program.

Furthermore, each unit of the structural elements included in each of the devices described above may be individually configured into a single chip, or some or all of the units may be configured into a single chip.

Moreover, although a system LSI is mentioned here, the integrated circuit can also be called an IC, a LSI, a super LSI, and an ultra LSI, depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(16) Some or all of the structural elements included in each of the devices described above may be implemented as a standalone module or an IC card that can be inserted into and removed from the device. The IC card or the module is a computer system made up of a microprocessor, ROM, RAM, and so on. The IC card or the module may include the aforementioned super multifunctional LSI. The IC card or the module achieves its functions by way of the microprocessor operating according to the computer program. The IC card and the module may be tamperproof.

(17) The present disclosure may be the above-described methods. Furthermore, the present disclosure may be a computer program for implementing these methods using a computer or may be a digital signal of the computer program. For example, one aspect of the present disclosure may also be a computer program for causing a computer to execute the respective characteristic steps included in the communication log aggregation method illustrated in one of FIG. 7 to FIG. 9, FIG. 11, FIG. 13, and FIG. 18 to FIG. 20.

Furthermore, the present disclosure may be a computer program or a digital signal recorded on a computer-readable recording medium, such as a flexible disk, a hard disk, a compact disc (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on these recoding media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and memory. The memory may have the computer program recorded thereon, and the microprocessor may operate according to the computer program.

Moreover, by transferring the recording medium having the program or the digital signal recorded thereon or by transferring the program or the digital signal via the network or the like, the present disclosure may be implemented by a different independent computer system.

(18) The sequence in which the steps in the flowcharts described in the foregoing embodiments are executed is given as an example to describe the present disclosure in specific terms, and thus other sequences are possible. Moreover, part of the above-described steps may be executed simultaneously (in parallel) with another step, or part of the above-described steps may be excluded.

Furthermore, the separation of the function blocks in the block diagrams described in the foregoing embodiments is merely an example, and plural function blocks may be implemented as a single function block, a single function block may be separated into plural function blocks, or part of functions of a function block may be transferred to another function block. Moreover, the functions of function blocks having similar functions may be processed, in parallel or by time-division, by a single hardware or software product.

(19) The foregoing embodiments have described an example in which the control network system is an in-vehicle network monitoring system, but this is not limiting; the control network system may be a network system in a home, a network system in a facility (for example, a hospital), or a network system in a factory, for example.

(20) The foregoing embodiments and the foregoing variations may be combined with each other.

INDUSTRIAL APPLICABILITY

The present disclosure is effective in communication log aggregation devices or the like in control network systems such as in-vehicle network systems.

The invention claimed is:

1. A communication log aggregation device used in a control network system, the control network system including two or more subnetworks, the communication log aggregation device being disposed in the control network system and comprising:
   a processor; and
   a memory including a program, the program, when executed by the processor, causing the processor to:
      obtain flow information including one or more flow records and first statistical information for each flow from each of collection devices, the one or more flow records each including flow identification information included in a message received by at least one observer, the flow being classified based on the flow identification information, the collection devices each being disposed in a different one of the two or more subnetwork systems and each collecting the one or more flow records and the first statistical information for each flow from the message received by the at least one observer, the at least one observer being disposed in the control network system and receiving the message; and
      generate aggregated flow information by performing at least one of: (i) selecting at least one of the one or more flow records included in one or more flow information items in the flow information obtained, (ii) adding second statistical information based on the first statistical information, and (iii) deleting at least one of the one or more flow records, and outputs the aggregated flow information generated,
   wherein the communication log aggregation device is installed in a vehicle, and
   the program further causes the processor to, based on a vehicle state of the vehicle, at least one of: (i) select at least one of the one or more flow records; (ii) add the second statistical information; and (iii) delete at least one of the one or more flow records.

2. The communication log aggregation device according to claim 1, wherein
   the at least one observer includes a first observer and a second observer, and the first observer and the second observer are disposed in the control network system,
   the processor obtains first flow information collected from the message received by the first observer and second flow information collected from the message received by the second observer, and
   when the flow identification information of a first flow record included in the first flow information and the flow identification information of a second flow record included in the second flow information are identical, the processor excludes one of the first flow record and the second flow record in generating the aggregated flow information.

3. The communication log aggregation device according to claim 2, wherein
   each of the one or more flow information items includes observer identification information identifying the at least one observer that has collected the flow information item, and
   the processor adds the observer identification information included in one of the first flow information and the second flow information to an other of the first flow information and the second flow information.

4. The communication log aggregation device according to claim 2, wherein
   the first statistical information includes a statistic based on an amount of messages received, each of the messages being the message, and
   when one or more flow identification information items of the first flow record included in the first flow information and one or more flow identification information items of the second flow record included in the second flow information are identical and furthermore, a first reception amount included in the first flow information and a second reception amount included in the second flow information satisfy a predetermined relationship, the processor excludes one of the first flow record and the second flow record in generating the aggregated flow information.

5. The communication log aggregation device according to claim 4, wherein
   when the first reception amount and the second reception amount do not satisfy the predetermined relationship, the processor further adds, to at least one of the first flow record or the second flow record, an anomaly identification flag indicating presence of an anomaly.

6. The communication log aggregation device according to claim 4, wherein
the predetermined relationship includes a condition that a difference between the first reception amount and the second reception amount is within a predetermined value.

7. The communication log aggregation device according to claim 1, wherein
the program further causes the processor to:
determine the vehicle state of the vehicle.

8. The communication log aggregation device according to claim 7, wherein
the vehicle state includes one of a state of being stationary and a state of self-driving.

9. The communication log aggregation device according to claim 8, wherein
when the vehicle state is the state of being stationary, the processor selects a flow record related to at least one of a diagnosis command or an update command from among the one or more flow records, and generates the aggregated flow information that includes the flow record selected.

10. The communication log aggregation device according to claim 8, wherein
when the vehicle state is the state of self-driving, the processor selects a flow record related to self-driving control from among the one or more flow records, and generates the aggregated flow information that includes the flow record selected.

11. The communication log aggregation device according to claim 8, wherein
when the vehicle state is neither the state of being stationary nor the state of self-driving, the processor generates the aggregated flow information that includes the one or more flow information items obtained.

12. The communication log aggregation device according to claim 7, wherein
the at least one observer includes two or more observers, and each of the two or more observers is disposed in a corresponding one of the two or more subnetworks and includes a corresponding one of the collection devices, and
the processor changes, according to the vehicle state, a priority given to each of two or more observers, and changes, based on the priority changed, a ratio of one or more flow records collected by the two or more observers to be included in the aggregated flow information.

13. The communication log aggregation device according to claim 7, wherein
the at least one observer includes: a third observer that communicates with an external network; a fourth observer that communicates with applications; and a fifth observer that communicates with an internal network.

14. The communication log aggregation device according to claim 12, wherein
the one or more flow information items further include the first statistical information that has previously been obtained, and
the processor generates the aggregated flow information based on the vehicle state of the vehicle and difference information that is a difference between the first statistical information and the first statistical information that has previously been obtained.

15. The communication log aggregation device according to claim 14, wherein
when the vehicle state is a state of being stationary and a total number of third flow information items in which the first statistical information that has previously been obtained is zero and the first statistical information is other than zero is greater than or equal to a first number, the processor generates the aggregated flow information that includes the third flow information items, and
when the vehicle state is not the state of being stationary and a total number of fourth flow information items in which the first statistical information that has previously been obtained is zero and the first statistical information is other than zero is greater than or equal to a second number less than the first number, the processor generates the aggregated flow information that includes the fourth flow information items.

16. The communication log aggregation device according to claim 15, wherein
the processor further adds different flags to each of the third flow information items and each of the fourth flow information items.

17. The communication log aggregation device according to claim 1, wherein
the flow identification information includes at least one of a source IP address, a destination IP address, a source port number, a destination port number, a protocol number, or message ID, or includes a combination of two or more of the source IP address, the destination IP address, the source port number, the destination port number, the protocol number, and the message ID.

18. The communication log aggregation device according to claim 1, wherein
the at least one observer is an Ethernet switch included in the control network system and to which one or more electronic control devices are connected.

19. The communication log aggregation device according to claim 1, wherein
the aggregated flow information is output in a format of internet protocol flow information export (IPFIX) or NetFlow.

20. A communication log aggregation method that is executed by a communication log aggregation device, the communication log aggregation device being used in a control network system, the control network system including two or more subnetworks, the communication log aggregation method comprising:
obtaining flow information including one or more flow records and first statistical information for each flow from each of collection devices, the one or more flow records each including flow identification information included in a message received by at least one observer, the flow being classified based on the flow identification information, the collection devices each being disposed in a different one of the two or more subnetwork systems and each collecting the one or more flow records and the first statistical information for each flow from the message received by the at least one observer, the at least one observer being disposed in the control network system and receiving the message; and
generating aggregated flow information by performing at least one of: (i) selecting at least one of the one or more flow records included in one or more flow information items in the flow information obtained, (ii) adding second statistical information based on the first statistical information, and (iii) deleting at least one of the one or more flow records, and outputting the aggregated flow information generated, wherein the communication log aggregation device is installed in a vehicle, and the communication log aggregation method further comprises:

performing, based on a vehicle state of the vehicle, at least one of: (i) selecting at least one of the one or more flow records; (ii) adding the second statistical information; and (iii) deleting at least one of the one or more flow records.

* * * * *